(12) United States Patent
Suffritti et al.

(10) Patent No.: US 12,447,255 B2
(45) Date of Patent: Oct. 21, 2025

(54) APPARATUS FOR EXTRACORPOREAL BLOOD TREATMENT

(71) Applicant: Gambro Lundia AB, Lund (SE)

(72) Inventors: Mauro Suffritti, Medolla (IT); Mauro Gusella, Castelvetro di Modena (IT); Stefano Ganzerli, Medolla (IT); Fabrizio Molducci, San Felice sul Panaro (IT); Paola Crivellari, Casumaro (IT); Alfonso Vollono, Medolla (IT); Marisa Torrini, San Felice sul Panaro (IT); Sonja Bellini, San Felice sul Panaro (IT)

(73) Assignee: Gambro Lundia AB, Lund (SE)

( * ) Notice: Subject to any disclaimer, the term of this patent is extended or adjusted under 35 U.S.C. 154(b) by 442 days.

(21) Appl. No.: 17/776,899

(22) PCT Filed: Dec. 21, 2020

(86) PCT No.: PCT/EP2020/087402
§ 371 (c)(1),
(2) Date: May 13, 2022

(87) PCT Pub. No.: WO2021/130154
PCT Pub. Date: Jul. 1, 2021

(65) Prior Publication Data
US 2022/0401637 A1    Dec. 22, 2022

(30) Foreign Application Priority Data

Dec. 24, 2019    (EP) ..................................... 19219603

(51) Int. Cl.
*A61M 1/36*    (2006.01)
*A61M 1/16*    (2006.01)

(52) U.S. Cl.
CPC ........ *A61M 1/3652* (2014.02); *A61M 1/1672* (2014.02); *A61M 1/3646* (2014.02); *A61M 1/3649* (2014.02)

(58) Field of Classification Search
CPC .......................... A61M 1/3621; A61M 1/3643
See application file for complete search history.

(56) References Cited

U.S. PATENT DOCUMENTS 4,444,597 A    4/1984    Gortz et al.
5,685,835 A    11/1997   Brugger
(Continued)

FOREIGN PATENT DOCUMENTS

AU    2017218992    9/2017
CN    106687156     5/2017
(Continued)

OTHER PUBLICATIONS

European Extended Search Report, Appl. No. 19219603.8 dated Jul. 6, 2020—7 pages.
(Continued)

*Primary Examiner* — Ryan B Huang
(74) *Attorney, Agent, or Firm* — K&L Gates LLP

(57) ABSTRACT

An apparatus (1) for extracorporeal blood treatment comprises a filtration unit (2) having a primary chamber (3) and a secondary chamber (4) separated by a semi-permeable membrane (5), a blood circuit (17) comprising at least a blood withdrawal line (6) and a blood return line (7), a fluid circuit (32) comprising a fluid supply source (50) for providing a sterile fluid, and at least one gas inlet (49) to allow gas to enter into the blood circuit (17). The apparatus further comprises a control unit configured to perform a blood restitution procedure towards the patient for ending an extracorporeal blood treatment and before disconnecting the patient, said blood restitution procedure comprising the
(Continued)

steps of infusing a predetermined amount of sterile fluid from the supply source (50) into the blood circuit (17) and causing a predetermined amount of gas to enter into the blood circuit (17) from the gas inlet (49).

25 Claims, 14 Drawing Sheets

(56) References Cited

U.S. PATENT DOCUMENTS

| | | | |
|---|---|---|---|
| 6,122,900 | A | 9/2000 | Mossbeck et al. |
| 7,862,660 | B2 | 1/2011 | Murawski et al. |
| 7,985,196 | B2 | 7/2011 | Kopperschmidt et al. |
| 8,409,127 | B2 | 4/2013 | Gronau et al. |
| 8,691,146 | B2 | 4/2014 | Sato et al. |
| 8,991,414 | B2 | 3/2015 | Gronau et al. |
| 8,994,414 | B2 | 3/2015 | Sugahara |
| 9,751,049 | B2 | 9/2017 | Labib et al. |
| 9,895,479 | B2 | 2/2018 | Meyer |
| 9,962,479 | B2 | 5/2018 | Parisotto et al. |
| 9,968,723 | B2 | 5/2018 | Rohde et al. |
| 10,080,832 | B2 | 9/2018 | Matsuzaki et al. |
| 10,376,628 | B2 | 8/2019 | Blasek et al. |
| 2003/0100857 | A1 | 5/2003 | Pedrazzi et al. |
| 2013/0025697 | A1* | 1/2013 | Blasek .............. A61M 1/36224 137/15.04 |
| 2014/0190887 | A1* | 7/2014 | Rohde .................... B01D 65/02 210/636 |
| 2018/0161488 | A1 | 6/2018 | Becker et al. |
| 2018/0256802 | A1 | 9/2018 | Rohde et al. |
| 2019/0001043 | A1 | 1/2019 | Spikermann et al. |
| 2021/0015990 | A1* | 1/2021 | Rovatti ................ A61B 5/6866 |

FOREIGN PATENT DOCUMENTS

| | | |
|---|---|---|
| DE | 3442744 | 6/1986 |
| EP | 1161271 | 12/2001 |
| EP | 3 192 542 B1 | 7/2017 |
| JP | 2002095740 | 4/2002 |

OTHER PUBLICATIONS

International Search Report, Appl. No. PCT/EP2020/087402 dated Apr. 6, 2021—4 pages.
Written Opinion of the International Searching Authority, Appl. No. PCT/EP2020/087402 dated Apr. 6, 2021—6 pages.
China Search Report Application No. 202080090382.5 dated Dec. 24, 2019—2 pages.
China Office Action Application No. 202080090382.5 issuing No. 2025061601636400 dated Jun. 16, 2025—10 pages.

* cited by examiner

APPARATUS FOR EXTRACORPOREAL BLOOD TREATMENT

PRIORITY CLAIM

The present application is a National Phase of International Application No. PCT/EP2020/087402, filed 21 Dec. 2020, which claims priority to EP Application No. 19219603.8 filed 24 Dec. 2019. The entire contents of each application are incorporated herein by reference and relied upon.

FIELD OF THE INVENTION

The present invention relates to an apparatus for extracorporeal blood treatment configured to and a method aimed to perform an automatic blood restitution procedure before disconnecting the patient from the apparatus. In more detail, the blood restitution procedure is performed by allowing to enter in the blood circuit both sterile fluid and gas. The blood restitution procedure further allowing to substantially emptying the blood circuit from liquids.

BACKGROUND OF THE INVENTION

The kidneys fulfil many functions, including the removal of water, the excretion of catabolites (or waste from the metabolism, for example urea and creatinine), the regulation of the concentration of the electrolytes in the blood (e.g. sodium, potassium, magnesium, calcium, bicarbonates, phosphates, chlorides) and the regulation of the acid/base equilibrium within the body, which is obtained in particular by the removal of weak acids and by the production of ammonium salts.

In individuals who have lost the use of their kidneys, since these excretion and regulation mechanisms no longer work, the body accumulates water and waste from the metabolism and exhibits an excess of electrolytes. In order to overcome renal dysfunction, resort is conventionally made to a blood treatment involving extracorporeal circulation within a blood circuit through an exchanger having a semipermeable membrane (dialyzer) in which the patient's blood is circulated on one side of the membrane and a dialysis liquid, comprising the main electrolytes of the blood in concentrations close to those in the blood of a healthy subject, is circulated on the other side. The patient is connected to the extracorporeal blood circuit through a withdrawal (or arterial) and a return (or venous) line, the latter having respective needles at the end portions. A pressure difference is created between the two compartments of the dialyzer which are delimited by the semipermeable membrane, so that a fraction of the plasma fluid passes by ultrafiltration through the membrane into the compartment containing the dialysis liquid. The blood treatment which takes place in a dialyzer as regards waste from the metabolism and electrolytes results from two mechanisms of molecular transport through the membrane. Once the treatments has terminated, extracorporeal blood should be restituted to the patient and the patient has to be disconnected from the withdrawal and the return blood lines of the extracorporeal blood circuit by removing the respective needles: the blood lines are subsequently disposed. Anyhow, since the blood circuit is still filled with blood (if no or only partial restitution is made) and/or residual liquids, the lines may represent a risks of contamination, leading to high disposal costs. Moreover, disconnection of blood lines still filled with blood, blood residuals or contaminated fluids determines severe health risks for the operator: indeed, although the end clamps may be closed to prevent dripping, the last ends of the blood lines (i.e. the needles) still comprise liquid inside which might be a potential source of contamination.

Document U.S. Pat. No. 5,685,835A relates to an apparatus and method for disinfecting a contaminated blood tubing set (BTS) while the blood tubing set is attached to a dialysis machine following a dialysis procedure. The tubing set comprises a conventional dialyzer, a blood pump, a venous line and an arterial line configured to be attached to the patient. A saline tubing is also connected to an arterial reservoir so that saline may be directly administered to the patient, from a saline bag, during treatment in case of low blood pressure or for flushing the dialyzer with saline solution during initial priming. The saline bag may also be used at the conclusion of the dialysis treatment to return the blood remaining within the BTS to the patient. Gravity will then operate to draw saline from the bag into the arterial reservoir and force the blood remaining within the arterial reservoir and the arterial line back into the patient. The arterial clamp is then closed so that the arterial connector may be removed from the patient. Next, the blood pump is started to draw saline from the arterial reservoir and the bag through the dialyzer and the venous reservoir, forcing the remaining blood back into the patient through the venous line. Once the saline has displaced substantially all the blood from the BTS, the venous clamp is closed so that also the venous connector may be detached from the patient. Once the patient is detached from the arterial and venous connectors, the dialysis machine is commanded to clean and disinfect the BTS before the BTS is detached from the machine. Cleaning procedure may comprise connecting the arterial line to the dialysate hydraulics commanded to produce a supply of a cleaner or disinfectant to be pumped to the BTS by the blood pump. Moreover, the dialysate hydraulics may also supply air to the BTS after it has been flushed with the disinfectant solution and after removal from the patient, so that the blood pump may pump air through the BTS to substantially remove the solution. Anyhow, air introduction into the BTS occurs with the patient already disconnected from the blood lines: this implies that, during patient disconnection, the blood lines are still filled with saline or disinfectant solution (in particular the needles), thereby leading to risks of contamination for the operator.

Document WO0151106A1 relates to a method for emptying a blood circuit of an apparatus for extracorporeal blood treatment at the end of a treatment session, when the blood contained in the circuit has almost been returned to the patient. The apparatus comprises a blood treatment device having a first and a second compartments separated from one another by a semi permeable membrane, an arterial pipe having a first end connected to an inlet of the first compartment and a second end connectable to the patient. The apparatus further comprises a venous pipe having a first end connected to an outlet of the first compartment and a second end connectable to the patient. The cleaning method comprises stopping the blood pump for the time necessary for disconnecting the arterial pipe from the patient and for connecting it to a flexible bag containing a sterile saline solution: then the blood pump is run again and the blood contained in the circuit is pushed by the sterile solution towards the venous needle and is returned to the patient. When the saline solution reaches the end of the venous pipe, the blood pump is stopped. In order to empty the blood circuit, which is full of saline solution and residual blood, the venous pipe is also disconnected from the patient, and the second end of the arterial pipe is connected to the second end of the venous pipe resulting in the blood circuit being closed on itself. The blood pump is run again so as to circulate the saline solution in the closed loop circuit at a moderate flow rate, while the two pumps arranged on the dialysis circuit are run at different speed rate, in particular wherein the speed of the downstream pump being faster that the speed of the upstream pump. As a result, the liquid contained in the closed loop is transferred, by filtration, through the membrane from the first compartment to the second compartment of the dialyzer and is then discarded through the drain pipe. The document also mentions another method to clean up the circuit consisting in pumping air in the arterial pipe so as to push the blood contained in the dialyzer and blood circuit towards the venous needle and transfer the residual blood to the patient.

Anyhow, the document does not disclose any additional detail about the air infusion procedure in order to make it safe, reliable and easy to implement. On the contrary, the document makes reference only to the drawbacks of the air infusion, without proposing, disclosing or even suggesting any way to make this procedure feasible.

SCOPE OF THE INVENTION

The scope of this invention is therefore to at least partially solve one or more of the drawbacks and/or limitations affecting the previous solutions.

An aim of embodiments of the present invention is providing an extracorporeal blood treatment apparatus able to perform a proper and safe blood restitution procedure, allowing a substantially dry patient disconnection after treatment.

A further aim of embodiments of the present invention is providing an extracorporeal blood treatment apparatus able to substantially empty, after the treatment session, the blood lines from blood, blood residuals, or any contaminated fluid, to make subsequent disposal of the blood lines easier, safer and cheaper.

More in detail, a further aim of embodiments of the present invention is providing an extracorporeal blood treatment apparatus able to allow a safe patient disconnection, avoiding alternate sterile and non-sterile steps for the nurse in charge with the procedure and reducing at the same time contamination risks for the operator in charge for the disconnection.

A further aim of embodiments of the present invention is providing an extracorporeal blood treatment apparatus able to substantially clean up and empty the blood lines in an automatic manner, without the need of a prior patient disconnection.

A further aim of embodiments of the present invention is providing an extracorporeal blood treatment apparatus able to restitute to the patient a substantial amount of residual blood present in the blood circuit of the apparatus after a treatment session, limiting at the same time the amount of dialysis fluid infused into the blood stream of the patient.

SUMMARY SECTION

A 1st aspect refers to an apparatus (1) for extracorporeal blood treatment comprising:
  a filtration unit (2) having a primary chamber (3) and a secondary chamber (4) separated by a semi-permeable membrane (5);
  a blood circuit (17) comprising at least:
    a blood withdrawal line (6) extending between a first end connected to an inlet of the primary chamber and a second end suitable for connection to a patient (P); and
    a blood return line (7) extending between a first end connected to an outlet of the primary chamber (3) and a second end suitable for connection to said patient (P);
  a fluid circuit (32) comprising at least:
    a dialysis fluid effluent line (13) connected to an outlet of the secondary chamber (4);
    a fluid supply source (50) for providing a sterile fluid, such as a dialysis or replacement fluid;
  optionally at least one gas inlet (49) to allow gas to enter into the blood circuit (17).

In a 2nd aspect according to the preceding aspect, the apparatus (1) further comprises a control unit (12) configured to perform a blood restitution procedure towards the patient (P) for ending an extracorporeal blood treatment and before disconnecting the patient.

In an additional independent aspect a method for blood restitution performed by an apparatus (1) for extracorporeal blood treatment according to any of the preceding aspects is provided, the method comprises the step of performing a blood restitution procedure towards the patient (P) for ending an extracorporeal blood treatment and before disconnecting the patient.

In a further aspect according to the preceding two aspects, said blood restitution procedure comprises the following steps:
  causing a predetermined amount of gas to enter into the secondary chamber (4) of the filtration unit (2);
  infusing a predetermined amount of sterile fluid from the supply source (50) into the blood circuit (17), said step comprising back-filtering the sterile fluid, in particular a dialysis fluid, through the semi-permeable membrane (5) into the blood circuit (17),
during said step of back filtering, the secondary chamber (4) of the filtration unit being filled with both gas and sterile fluid,
in particular said predetermined amount of fluid determining a complete or partial blood restitution.

In an aspect 2 bis according the any of the preceding aspects, the blood restitution procedure comprises the following steps:
  infusing a predetermined amount of sterile fluid from the supply source (50) into the blood circuit (17);
  causing a predetermined amount of gas to enter into the blood circuit (17) from the gas inlet (49).

A 3rd aspect refers to a method for blood restitution performed by an apparatus (1) for extracorporeal blood treatment, said apparatus (1) being in particular according to any of the preceding aspects, wherein the apparatus comprises:
  a filtration unit (2) having a primary chamber (3) and a secondary chamber (4) separated by a semi-permeable membrane (5);
  a blood circuit (17) comprising at least:
    a blood withdrawal line (6) extending between a first end connected to an inlet of the primary chamber and a second end for connection to a patient (P); and
    a blood return line (7) extending between a first end connected to an outlet of the primary chamber (3) and a second end for connection to said patient (P);

a fluid circuit (32) comprising at least:
- a dialysis fluid effluent line (13) connected to an outlet of the secondary chamber (4);
- a fluid supply source (50) for providing a sterile fluid, such as a dialysis or replacement fluid;
- at least one gas inlet (49) to allow gas to enter into the blood circuit (17);

wherein the method comprises a blood restitution procedure for ending an extracorporeal blood treatment before disconnecting the patient, said blood restitution procedure being executed by a control unit (12) and comprising the following steps:
- infusing a predetermined amount of sterile fluid from the supply source (50) into the blood circuit (17);
- causing a predetermined amount of gas to enter into the blood circuit (17) from the gas inlet (49).

During execution of the blood restitution procedure, the second end of the blood withdrawal line (6) being connected to the patient (P), and the second end of the blood return line (7) being connected to the patient (P).

During execution of the blood restitution procedure, the treatment of the extracorporeal blood is terminated.

In a 4th aspect according to any of the preceding aspects, the apparatus (1) further comprises a blood pump (21) operative on the blood circuit (17).

In a 5th aspect according to any of the preceding aspects 2, 3 or 4, said infusing step of sterile fluid defines at least one fluid-blood interface (FBI) into the blood circuit (17) and the step of causing a predetermined amount of gas to enter into the blood circuit (17) defines at least one gas-fluid interface (GFI) into the blood circuit (17).

In a 6th aspect according to any of the preceding aspects, at least part of the sterile fluid is interposed between the at least one fluid-blood interface (FBI) and the at least one gas-fluid interface (GFI).

In a 7th aspect according to any of the preceding aspects, the control unit (12) is further configured for moving simultaneously:
- at least part of the extracorporeal blood contained in the blood circuit (17),
- said at least part of the sterile fluid interposed between the fluid-blood interface (FBI) and the gas-fluid interface (GFI), and
- at least part of the gas towards the patient (P) to restitute part of the blood to the patient (P) before patient disconnection.

In a 8th aspect according to any of the preceding aspects, the predetermined amount of sterile fluid is lower in volume than said predetermined amount of gas.

In a 9th aspect according to any of the preceding aspects, said step of infusing a predetermined amount of sterile fluid from the dialysis fluid supply source (50) into the blood circuit (17) comprises infusing the sterile fluid in an amount sufficient to at least reach a location of the gas inlet (49), in particular of a first gas inlet (49a).

In a 10th aspect according to any of the preceding aspects, said step of infusing a predetermined amount of sterile fluid from the dialysis fluid supply source (50) into the blood circuit (17) comprises infusing the sterile fluid in an amount sufficient to reach and pass beyond the location of the gas inlet (49), in particular of a first gas inlet (49a).

In a 11th aspect according to any of the preceding aspects, the fluid circuit (32) further comprises a dialysis fluid supply line (8) connected to an inlet of the secondary chamber (4), the fluid supply source (50) being a dialysis fluid supply source and providing a dialysis fluid at least to the dialysis fluid supply line (8).

In a 12th aspect according to any of the preceding aspects, said step of infusing a predetermined amount of sterile fluid from the dialysis fluid supply source (50) into the blood circuit (17) comprises back-filtering the dialysis fluid through the semi-permeable membrane (5) into the blood circuit (17), in particular in an amount of dialysis fluid sufficient to at least reach a location of the gas inlet (49).

In a 13th aspect according to any of the preceding aspects, the amount of dialysis fluid is sufficient to reach and pass beyond the location of the gas inlet (49), in particular of a first gas inlet (49a).

In a 14th aspect according to any of the preceding aspects, the fluid circuit (32) further comprises an infusion line (39) fluidly connected to the blood circuit (17), in particular fluidly connected to the blood withdrawal line (6) and/or to the blood return line (7).

In a 15th aspect according to the preceding aspect, the infusion line (39) is configured to infuse the sterile fluid into the blood circuit (17), the sterile fluid being in particular a replacement fluid or saline.

In a 16th aspect according to the two preceding aspects, the infusion line (39) is fluidly connected to the blood circuit (17) at an infusion point interposed between the first end and the second end of the blood withdrawal line (6) or of the blood return line (7).

In a 17th aspect according to any of the preceding aspects, the fluid supply source (50) is a dialysis fluid supply source connected to the infusion line (39) for providing the dialysis fluid at least to the infusion line (39), or
- the fluid supply source (50) is a replacement fluid supply source, in particular a container or a bag, providing the replacement fluid at least to the infusion line (39), or
- the fluid supply source (50) is a sterile fluid supply source, in particular a container or a bag, for example containing saline, providing the sterile fluid at least to the infusion line (39).

In a 18th aspect according to any of the preceding aspects, said step of infusing a predetermined amount of sterile fluid from the dialysis fluid supply source (50) into the blood circuit (17) comprises infusing the sterile fluid through the infusion line (39) directly into the blood circuit (17), in particular in an amount of sterile fluid sufficient to at least reach a location of the gas inlet (49), in particular of a first gas inlet (49a).

In a 19th aspect according to any of the preceding aspects, the amount of dialysis or replacement fluid is sufficient to reach and pass beyond the location of the gas inlet (49), in particular of a first gas inlet (49a).

In a 20th aspect according to any of the preceding aspects, the step of causing the predetermined amount of gas to enter into the blood circuit (17) comprises commanding activation of the blood pump (21) to suck gas from the at least one gas inlet (49).

In a 21st aspect according to any of the preceding aspects, the control unit (12) is configured to execute the step of infusing a predetermined amount of sterile fluid from the supply source (50) into the blood circuit (17) to restitute to the patient (P) part of the extracorporeal blood contained in the blood circuit (17).

In a 22nd aspect according to any of the preceding aspects, said at least one fluid-blood interface (FBI) comprises a first fluid-blood interface (FBI') and a second fluid-blood interface (FBI") into the blood circuit (17).

In a 23rd aspect according to the preceding aspect, the first fluid-blood interface (FBI') is interposed between sterile fluid and the second end of the blood return line (7) and the second fluid-blood interface (FBI") is interposed between sterile fluid and the second end of the blood withdrawal line (6).

In a 24th aspect according to any of the preceding aspects, the at least one gas-fluid interface (GFI) comprises a first gas-fluid interface (GFI') and a second gas-fluid interface (GFI") into the blood circuit (20).

In a 25th aspect according to the preceding aspect, at least after the gas has entered the blood circuit (17), at least part of the sterile fluid is interposed between the first fluid-blood interface (FBI') and the first gas-fluid interface (GFI') and/or at least part of the sterile fluid is interposed between the second fluid-blood interface (FBI") and the second gas-fluid interface (GFI").

In a 26th aspect according to any of the preceding aspects, the step of causing the gas to enter determines the split of the sterile fluid infused into the blood circuit (17) in a first sterile fluid portion and a second sterile fluid portion.

In a 27th aspect according to the preceding aspect, said first sterile fluid portion is interposed between the first fluid-blood interface (FBI') and the first gas-fluid interface (GFI'), and the second sterile fluid portion is interposed between the second fluid-blood interface (FBI") and the second gas-fluid interface (GFI").

In a 28th aspect according to any of the two preceding aspects, the blood restitution procedure comprising moving the first sterile fluid portion towards the second end of the blood return line (7) and, simultaneously or sequentially, moving the second sterile fluid portion towards the second end of the blood withdrawal line (6).

In a 29th aspect according to any of the preceding aspects, the blood restitution procedure comprising moving the first fluid-blood interface (FBI') and the first gas-fluid interface (GFI') towards the second end of the blood return line (7) and moving the second fluid-blood interface (FBI") and the second gas-fluid interface (GFI") towards the second end of the blood withdrawal line (7).

In a 30th aspect according to any of the preceding aspects, the first sterile fluid portion and/or the second sterile fluid portion are comprises in volume between 50 ml and 200 ml.

In a 31st aspect according to any of the preceding aspects, the at least one gas inlet (49) comprises a first gas inlet (49a) arranged on the blood return line (7) and a second gas inlet (49b) arranged on the blood withdrawal line (6).

In a 32nd aspect according to the preceding aspect, the blood pump (21) is arranged on the blood withdrawal line (6).

In a 33rd aspect according to any of the preceding aspects, the second gas inlet (49b) is interposed between the blood pump (21) and the second end of the blood withdrawal line (6).

In a 34th aspect according to any of the preceding aspects, the apparatus (1) comprises an air separator (19a) arranged on the blood return line (7) and optionally an auxiliary air separator (19b) arranged on the blood withdrawal line (6).

In a 35th aspect according to the preceding aspect, the at least one gas inlet (49) is arranged at said air separator (19a).

In a 36th aspect according to any of the two preceding aspects, the first gas inlet (49a) is arranged on the air separator (19a) and optionally the second gas inlet (49b) is arranged on the auxiliary air separator (19b).

In a 37th aspect according to any of the preceding aspects, the infusion line (39) is connected to at least one between the air separator (19a) and the auxiliary air separator (19b).

In a 38th aspect according to any of the preceding aspects, the apparatus (1) comprises at least one intercepting element (59), in particular at least one valve or clamp, connected to said at least one gas inlet (49).

In a 39th aspect according to any of the preceding aspects, the apparatus comprises a first intercepting element (59a) connected to the first gas inlet (49a) and a second intercepting element (59b) connected to the second gas inlet (49b), the control unit (12) being configured, or the method comprising a step, to command the at least one intercepting element (59) between an open position, wherein gas flow is allowed, and a closed position wherein gas flow is prevented.

In a 40th aspect according to any of the preceding aspects, the apparatus (1) comprises a return blood safety clamp (20a) arranged on the blood return line (7) and a withdrawal blood safety clamp (20b) arranged on the blood withdrawal line (6).

In a 41st aspect according to the preceding aspect, said safety clamps (20a, 20b) are arranged closer to a vascular access (18) of the patient (P) than a respective of a first and a second gas inlets (49).

In a 42nd aspect according to any of the two preceding aspects, the control unit (12) is configured to command the return blood safety clamp (20a) and the blood return safety clamp (20b) between an open position, wherein flow is allowed, and a closed position wherein flow is prevented.

In a 43rd aspect according to any of the preceding aspects, the control unit (12) is configured, or the method comprises, to execute the restitution procedure according to a first configuration, said restitution procedure comprises to sequentially perform the following steps:
  command infusion of the predetermined amount of sterile fluid into the blood circuit (17) through the infusion line (39) or by back-filtering the dialysis fluid through the semi-permeable membrane (5), said step determining the sterile fluid to pass beyond the location of the gas inlet (49), in particular of the first gas inlet (49a), said step defining the first and the second fluid-blood interface (FBI', FBI");
  command the first intercepting element (59a) of the first gas inlet (49a) on the blood return line (7) in the open position, the second intercepting element (59b) of the second gas inlet (49b) on the blood withdrawal line (6) in the closed position, the blood return safety clamp (20a) in the closed position, and the blood withdrawal safety clamp (20b) in the open position;
  command activation of the blood pump (21) in a direction towards the second end of the blood withdrawal line (6) to cause sucking of the predetermined amount of gas into the blood circuit (17) from the first gas inlet (49a), this step defining the first and the second gas-fluid interfaces GFI', GFI" and determining the second gas-fluid interface (GFI") and the second fluid-blood interface (FBI") to move towards the second end of the blood withdrawal line (6) causing partial blood restitution to the patient (P) through the blood withdrawal line (6)

In a 44th aspect according to the preceding aspect, said restitution procedure according to the first configuration further comprises to sequentially perform the following steps:
  command the blood withdrawal safety clamp (20b) in the closed position, the blood return safety clamp (20a) in the open position, the first intercepting element (59a) of the first gas inlet (49a) on the blood return line (7) in the closed position and the second intercepting element (59b) of the second gas inlet (49b) on the blood withdrawal line (6) in the open position;

command activation of the blood pump (21) in a direction towards the second end of the blood return line (7), this step determining the at least one gas-fluid interface (GFI), in particular the first gas-fluid interface (GFI') and the first fluid-blood interface (FBI'), to move towards the second end of the blood return line (7) causing restitution to the patient (P) of an amount of blood through the blood return line (7);

optionally, before the step of infusing the sterile fluid into the blood circuit (17), command at least one between the return blood safety clamp (20a) and the withdrawal blood safety clamp (20b) in the open position, in particular command:

the return blood safety clamp (20a) in the open position; and the withdrawal blood safety clamp (20b) in the closed position or the blood pump (21) to stop.

In a 45th aspect according to any of the preceding aspects, the restitution procedure, according to a second configuration, implies to sequentially perform the following steps:

command infusion of the predetermined amount of sterile fluid into the blood circuit (17) through the infusion line (39) or by back-filtering the dialysis fluid through the semi-permeable membrane (5), said step determining the sterile fluid to pass beyond the location of the gas inlet (49), said gas inlet (49) being arranged on the blood return line (7), said step defining the first and the second fluid-blood interface (FBI', FBI'');

optionally determine a partial blood restitution through the blood return line (7) due to the sterile fluid infusion, the blood return safety clamp (20a) being in the open position;

command the intercepting element (59) of the gas inlet (49) in the open position, the blood return safety clamp (20a) in the closed position, and the blood withdrawal safety clamp (20b) in the open position;

command activation of the blood pump (21) in a direction towards the second end of the blood withdrawal line (6) to cause sucking of the predetermined amount of gas into the blood circuit (17) from the gas inlet (49), this step determining the at least one gas-fluid interface (GFI), in particular the second gas-fluid interface (GFI'') and the second fluid-blood interface (FBI''), to move towards the second end of the blood withdrawal line (6) causing blood restitution to the patient (P) through the blood withdrawal line (6).

In a 46th aspect according to any of the preceding aspects, the restitution procedure, according to a fourth configuration, implies to sequentially perform the following steps:

command infusion of the predetermined amount of sterile fluid into the blood circuit (17) through the infusion line (39) or by back-filtering the dialysis fluid through the semi-permeable membrane (5), said step determining the sterile fluid to pass beyond the location of the gas inlet (49), said gas inlet (49) being arranged on the blood withdrawal line (6), said step defining the first and the second fluid-blood interface (FBI', FBI'');

optionally determine a partial blood restitution through the blood withdrawal line (6) due to the sterile fluid infusion, the blood withdrawal safety clamp (20b) being in the open position;

command the intercepting element (59) of the gas inlet (49) in the open position, the blood withdrawal safety clamp (20b) in the closed position, and the blood return safety clamp (20a) in the open position;

command activation of the blood pump (21) in a direction towards the second end of the blood return line (7) to cause sucking of the predetermined amount of gas into the blood circuit (17) from the gas inlet (49), this step determining the at least one gas-fluid interface (GFI), in particular the first gas-fluid interface (GFI') and the first fluid-blood interface (FBI'), to move towards the second end of the blood return line (7) causing blood restitution to the patient (P) through the blood return line (7).

In a 47th aspect according to any of the preceding aspects, the apparatus (1) comprises a gas supply unit (60) connected to the at least one gas inlet (49), in particular to the first gas inlet (49a) and or to the second gas inlet (49b), and configured to forcedly infuse gas into the blood circuit (17), in particular said gas supply unit (60) being a gas pump.

In a 48th aspect according to any of the preceding aspects, the restitution procedure according to a third configuration implies to sequentially perform the following steps:

command infusion of the predetermined amount of sterile fluid into the blood circuit (17) through the infusion line (39) or by back-filtering the dialysis fluid through the semi-permeable membrane (5), said step determining the sterile fluid to pass beyond the location of the gas inlet (49), in particular of the first gas inlet (49a), said step defining the first and the second fluid-blood interface (FBI', FBI'');

command the intercepting element (59) of the at least one gas inlet (49) in the open position;

command at least one between the return blood safety clamp (20a) and the withdrawal blood safety clamp (20b) in the open position;

command activation of the gas supply unit (60) to infuse gas into the blood circuit (17), this step determining the at least one gas-fluid interface (GFI) and the at least one fluid-blood interface (FBI) to move towards the second end of the blood withdrawal line (6) causing restitution to the patient (P) of an amount of blood through the blood withdrawal line (6) and/or towards the second end of the blood return line (7) causing restitution to the patient (P) of an amount of blood through the blood return line (7), in particular this step determining:

the second gas-fluid interface GFI'' and the second fluid-blood interface FBI'' to move towards the second end of the blood withdrawal line 6 causing restitution to the patient P of an amount of blood through the blood withdrawal line 6; and/or the first gas-fluid interface GFI' and the first fluid-blood interface FBI' to move towards the second end of the blood return line 7 causing restitution to the patient P of an amount of blood through the blood return line 7;

optionally, before the step of infusing the sterile fluid into the blood circuit (17), command at least one between the return blood safety clamp (20a) and the withdrawal blood safety clamp (20b) in the open position.

In a 49th aspect according to any of the preceding aspects, the control unit (12) is configured, or the method comprises, to command the position to the return blood safety clamp (20a) or to the withdrawal blood safety clamp (20b) during the step of infusing gas into the blood circuit (17) by the gas supply unit (60) according to the third configuration of the restitution procedure to determine:

a simultaneous blood restitution through the blood withdrawal line (6) and the blood return line (7) when the return blood safety clamp (20a) and the withdrawal blood safety clamp (20b) are both commanded in the open position, in particular wherein the first fluid-blood interface (FBI') and the first gas-fluid interface (GFI')

move towards the second end of the blood return line (7) and the second fluid-blood interface (FBI") and the second gas-fluid interface (GFI") move towards the second end of the blood withdrawal line (6); or an arterial blood restitution through the blood withdrawal line (6) when the return blood safety clamp (20a) is commanded in the closed position and the withdrawal blood safety clamp (20b) is commanded in the open position, in particular wherein the second fluid-blood interface (FBI") and the second gas-fluid interface (GFI") move towards the second end of the blood withdrawal line (6); or a venous blood restitution through the blood return line (7) when the return blood safety clamp (20a) is commanded in the open position and the withdrawal blood safety clamp (20b) is commanded in the closed position, in particular wherein the first fluid-blood interface (FBI') and the first gas-fluid interface (GFI') move towards the second end of the blood return line (7).

In a 50th aspect according to any of the preceding aspects, the second and/or the third and/or the fourth configuration of the blood restitution procedure imply an apparatus (1) comprising a single gas inlet (49).

In a 51st aspect according to any of the preceding aspects, the apparatus (1) comprises a single gas inlet (49).

In a 52nd aspect according to any of the preceding aspects, the apparatus (1) comprises a dialysis fluid pump (25) located on the dialysis fluid supply line (8) and optionally a dialysate pump (26) located on the dialysate effluent line (13),
the control unit (12) being configured to activate the dialysis fluid pump (25) and optionally the dialysate pump (26) to perform the step of infusing the predetermined amount of sterile fluid into the blood circuit (17) by back filtering the fluid through the membrane (5) of the filtration unit (2) or to provide fluid to the infusion line (39).

In a 53rd aspect according to any of the preceding aspects, the apparatus comprises an infusion pump (43) arranged on the infusion line (39) and configured to pump the predetermined amount of sterile fluid into the blood circuit (17).

In a 54th aspect according to any of the preceding aspects, the blood pump (21) is a peristaltic occlusive blood pump.

In a 55th aspect according to any of the preceding aspects, the blood pump (21) is configured to determine or to interdict flow, in particular flow of blood, sterile fluid, and gas, in particular said blood pump being arranged prevent fluid flow towards the second end of the blood withdrawal line (6).

In a 56th aspect according to any of the preceding aspects, the control unit (12) is configured, or the method comprises, to stop the restitution procedure when said at least one fluid-blood interface (FBI) approaches at least one between the second end of the blood withdrawal line (6) and the second end of the blood return line (7) or when a preset amount of sterile fluid has been infused into the patient.

In a 57th aspect according to any of the preceding aspects, the control unit (12) is configured, or the method comprises, to stop the restitution procedure when the at least one gas-fluid interface (GFI) reaches a preset distance from at least one between the second end of the blood withdrawal line (6) and the second end of the blood return line (7) lower than 10 cm, in particular lower than 5 cm, said distance being measured along the respective blood line.

In a 58th aspect according to any of the preceding aspects, the control unit is configured, or the method comprises, to infuse the sterile fluid into the blood circuit (17) and to cause the gas to enter into the blood circuit (17) such that a distance between the fluid-blood interface (FBI) and the gas-fluid interface (GFI) is comprised between 0.5 cm and 10 cm, in particular between 1 cm and 5 cm, in particular said distance being measured along the respective blood line.

In a 59th aspect according to any of the preceding aspects, the predetermined amount of sterile fluid is comprised between the 5% and the 80% in volume of the predetermined amount of gas, in particular between the 10% and the 60%.

In a 60th aspect according to any of the preceding aspects, the blood circuit (17) defines a blood circuit inner volume, the latter being in particular determined at least by an inner volume of the blood withdrawal line (6), the blood return line (7), optionally said blood circuit inner volume being further determined by the air separator (19), in particular the first and the auxiliary air separators (19a, 19b), and the primary chamber (3) of the filtration unit (2).

In a 61st aspect according to the preceding aspect, the predetermined amount in volume of sterile fluid is comprised between 1% and 60% of said blood circuit inner volume, in particular between 2% and 40%, more in particular between 5% and 30%.

In a 62nd aspect according to any of the preceding aspects, the predetermined amount of gas is lower in volume than the blood circuit inner volume.

In a 63rd aspect according to any of the three preceding aspects, a total infused volume is defined by the sum of the predetermined amount of sterile fluid and the predetermined amount of gas, said total infused volume being comprised between the 60% and the 160% of the blood circuit inner volume.

In a 64th aspect according to any of the preceding aspects, the step of infusing the predetermined amount of sterile fluid in the blood circuit (17) is antecedent with respect to the step of causing the predetermined amount of gas to enter in the blood circuit (17).

In a 65th aspect according to any of the preceding aspects, the blood withdrawal and return lines (6, 7) are made of transparent material in particular so that, at least during the restitution procedure, the position of the fluid-blood interface (FBI) and/or the gas-fluid interface (GFI) is visible.

In a 66th aspect according to any of the preceding aspects, the blood circuit (17) comprises at least one gas sensor arranged close to the second end of the blood withdrawal line (6) and/or to the second end of the blood return line (7), said gas sensor being configured to provide a signal representative of the presence of gas in the respective blood line, the control unit (12) being configured or the method comprising to receive said signal and to stop advancement of the at least one gas-fluid interface (GFI), in particular the control unit being configured to implement at least one of the following operations as a function of the signal representative of the presence of gas:

stop the blood pump (21) or the gas supply unit (60);

move the blood withdrawal intercepting element (20b) in the closed position if the gas sensor of the blood withdrawal line (6) detects presence of gas;

move the blood return intercepting mean (20a) in the closed position if the gas sensor of the blood return line (7) detects presence of gas.

In a 67th aspect according to any of the preceding aspects, the gas supply unit (60) is a gas pump configured to provide gas into the blood circuit (17) at a pressure higher than the pressure present into the blood circuit (17) or a syringe manually or automatically commanded.

In a 68th aspect according to any of the preceding aspects, during the blood restitution procedure and in particular during the gas infusion, the blood withdrawal line (6) and the blood return line (7) are both connected to a cardiovascular access (18) of the patient (P).

In a 69th aspect according to any of the preceding aspects, the step of infusing the predetermined amount of sterile fluid determines a partial blood restitution to the patient, in particular the blood restituted to the patient being substantially equal in volume to the predetermined amount of sterile fluid.

In a 70th aspect according to any of the preceding aspects, the step of infusing the predetermined amount of sterile fluid determines a partial blood restitution to the patient, the step of infusing the predetermined amount of gas determining a further blood restitution to the patient, the partial blood restitution due to the infusion of sterile fluid being lower in volume with respect to the blood restitution determined by the infusion of gas.

In a 71st aspect according to any of the preceding aspects, the predetermined amount of sterile fluid is comprised between 50 ml and 200 ml.

In a 72nd aspect according to any of the preceding aspects, the predetermined amount of gas is comprised between 200 ml and 700 ml, said value being measured at 25° and at atmospheric pressure.

In a 73th aspect according to any of the preceding aspects, the infused gas is air.

In a 74th aspect according to any of the preceding aspects, during the blood restitution procedure and in particular during the steps of infusing the predetermined amount of sterile fluid and allowing the predetermined amount of gas into the blood circuit (17), the blood circuit (17) is not closed in loop, in particular wherein the second ends of the blood withdrawal line (6) and of the blood return line (7) are not connected each other to define a closed loop.

In a 75th aspect according to any of the preceding aspects, the inlet of the secondary chamber (4) of the filtration unit (2) is arranged at a lower level with respect to the outlet of said secondary chamber (4) of the filtration unit (2).

In a 76th aspect according to any of the preceding aspects, the blood restitution procedure comprises the step of causing a predetermined amount of gas to enter into the secondary chamber (4) of the filtration unit (2), in particular the semipermeable membrane being wet and no gas passing there through.

In a 77th aspect according to any of the preceding aspects, during the step of back filtering the dialysis fluid through the membrane (5), the secondary chamber (4) of the filtration unit is filled with both gas and sterile fluid.

In a 78th aspect according to any of the preceding aspects, wherein the secondary chamber (4) defines an inner volume filled, at least during said blood restitution procedure, with an amount of gas higher in volume than an amount of said sterile fluid, in particular wherein the inner volume of the secondary chamber (4) is filled by 60% with gas, more in particular with 75% of gas, even more in particular with 90% of gas.

In a 79th aspect according to any of the preceding aspects, at least one between the supply line (8) and the dialysis fluid effluent line (13) comprises a gas inlet configured to allow gas to enter into the fluid circuit (32), in particular said gas inlet comprising an intercepting element, for example a valve or a clamp, movable between an open and a closed position to respectively allow or prevent gas passage, said intercepting element being connected to the control unit (12) configured to command the open or the closed position.

In an 80th aspect according to any of the preceding aspects, the step of allowing the gas to enter into the secondary chamber (4) of the filtration unit comprises a step of commanding at least one between the dialysis supply pump (25) and the dialysate pump (26) to suck gas from the gas inlet of the fluid circuit (32).

In an 81st aspect according to any of the preceding aspects, the fluid circuit (32) comprises a gas supply unit fluidly connected to a gas inlet of the fluid circuit (32), in particular said gas inlet being arranged on at least one between the dialysis fluid supply line (8) and the dialysis fluid effluent line (13), said gas supply unit being configured to infuse gas into the fluid circuit (32) or directly into the secondary chamber (4) of the filtration unit (2).

In an 82nd aspect according to any of the preceding aspects, the apparatus comprises a gas sensor, in particular associated to the filtration unit (2), configured to provide a signal representative of the presence of gas and/or of the amount of gas included into the filtration unit (2), in particular into the secondary chamber (4) of the filtration unit (2), said gas sensor being for example a weight sensor, or a level sensor of the dialysis fluid present into the secondary chamber (4) of the filtration unit (2).

In an 83rd aspect according to any of the preceding aspects, the predetermined amount of infused fluid is able to fill the whole blood circuit.

In an 84th aspect according to any of the preceding aspects, the step of back filtering implies passage of sterile fluid, in particular dialysis fluid, from the secondary chamber (4) to the primary chamber (3) of the filtration unit (2).

In an 85th aspect according to any of the preceding aspects, the blood restitution procedure comprises, during the step of back filtering the sterile fluid, a push-pull procedure comprising to sequentially perform the following steps:
  commanding the blood withdrawal safety clamp 20b and the blood return safety clamp 20a in the closed position, and the intercepting element 59 of the gas inlet 49 of the blood return line 7 in the open position,
  activating the blood pump 21 towards the second end of the blood withdrawal line 6, in particular said step determining gas sucking from said gas inlet 49 into the blood circuit 17 and optionally compression of the gas included between the blood pump 21 and the blood withdrawal safety clamp 20b;
  commanding the intercepting element 59 of the gas inlet 49 of the blood return line 7 in the closed position, and the blood return safety clamp 20a in the open position;
  activating the blood pump 21 towards the second end of the blood return line 7, in particular said step determining moving of the residual fluid towards the patient through the blood return line 7, more in particular said step determining moving of the first gas-fluid interface GFI' towards the second end of the blood return line 7;
  optionally repeating in loop the previous steps of the push-pull procedure.

In a 86th aspect according to the preceding aspect, said push pull procedure is implemented at the end of the blood restitution procedure according to the second configuration.

In a 87th aspect according to any of the preceding aspects, the blood restitution procedure comprises, during the step of back filtering the sterile fluid, a push-pull procedure comprising to sequentially perform the following steps:
  commanding the blood withdrawal safety clamp 20b and the blood return safety clamp 20a in the closed position, and the intercepting element 59 of the gas inlet 49 of the blood withdrawal line 6 in the open position,
  activating the blood pump 21 towards the second end of the blood return line 7, in particular said step determining gas sucking from said gas inlet 49 into the blood circuit 17 and optionally compression of the gas included between the blood pump 21 and the blood return safety clamp 20a;

commanding the intercepting element 59 of the gas inlet 49 of the blood withdrawal line 6 in the closed position, and the blood withdrawal safety clamp 20b in the open position;

activating the blood pump 21 towards the second end of the blood withdrawal line 6, in particular said step determining moving of the residual fluid towards the patient through the blood withdrawal line 6, more in particular said step determining moving of the second gas-fluid interface GFI" towards the second end of the blood withdrawal line 6;

optionally repeating in loop the previous steps of the push-pull procedure.

In a 88th aspect according to the preceding aspect, said push pull procedure is implemented at the end of the blood restitution procedure according to the fourth configuration.

In a 89th aspect according to any of the preceding aspects, the blood restitution procedure comprises the step of infusing the predetermined amount of sterile fluid from the supply source (50) into the blood circuit (17), said step determining a complete blood restitution to the patient, in particular so that the blood circuit is substantially completely filled with sterile fluid.

In a $90^{th}$ aspect according to any of the preceding aspects, the blood restitution procedure comprises backfiltering the predetermined amount of sterile fluid from the supply source (50) into the blood circuit (17) and at least one of:

moving the sterile fluid towards the blood withdrawal line and up to the patient vascular access to restitute extracorporeal blood contained in the blood withdrawal line, in particular wherein the control unit is configured to drive the blood pump (21) to direct fluid towards the vascular access;

moving the sterile fluid towards the blood return line and up to the patient vascular access to restitute extracorporeal blood contained in the blood return line, in particular wherein the control unit is configured to drive the dialysis pump (25) and/or the dialysate pump (26) and/or the blood pump (21) to direct fluid towards the vascular access.

In a $91^{st}$ aspect according to the previous aspect, at the end of the blood restitution procedure the blood circuit is substantially completely filled with sterile fluid.

DRAWINGS

Some embodiments and some aspects of the invention will be described below with reference to the attached drawings, provided for illustrative purposes only, wherein.

DEFINITIONS

In this detailed description, corresponding parts illustrated in the various figures are indicated with the same numerical references. The figures may illustrate the invention through non-scale representations; therefore, parts and components illustrated in the figures relating to the object of the invention may relate exclusively to schematic representations.

Upstream and/Downstream

The terms upstream and downstream refer to a direction or trajectory of advancement of a fluid, in particular blood, configured to flow within the connector or along the fluid line during an extracorporeal blood treatment.

Sterile Fluid

The sterile fluid, which is referred to in the next description and claims, may be any fluid compatible with infusion in a blood circuit of a treatment apparatus, potentially fluidly connected to the vascular system of a patient, and that also meets adequate safety criteria for infusion into the patient. Thereby, the sterile fluid may be a sterile water solution, a saline solution, a replacement fluid containing electrolytes such glucose, sodium, chloride, potassium, calcium, magnesium, or glucose. The sterile fluid may also be the dialysis fluid employed by the apparatus during an extracorporeal blood treatment.

DETAILED DESCRIPTION

Blood Treatment Apparatus 1

Figure 1:
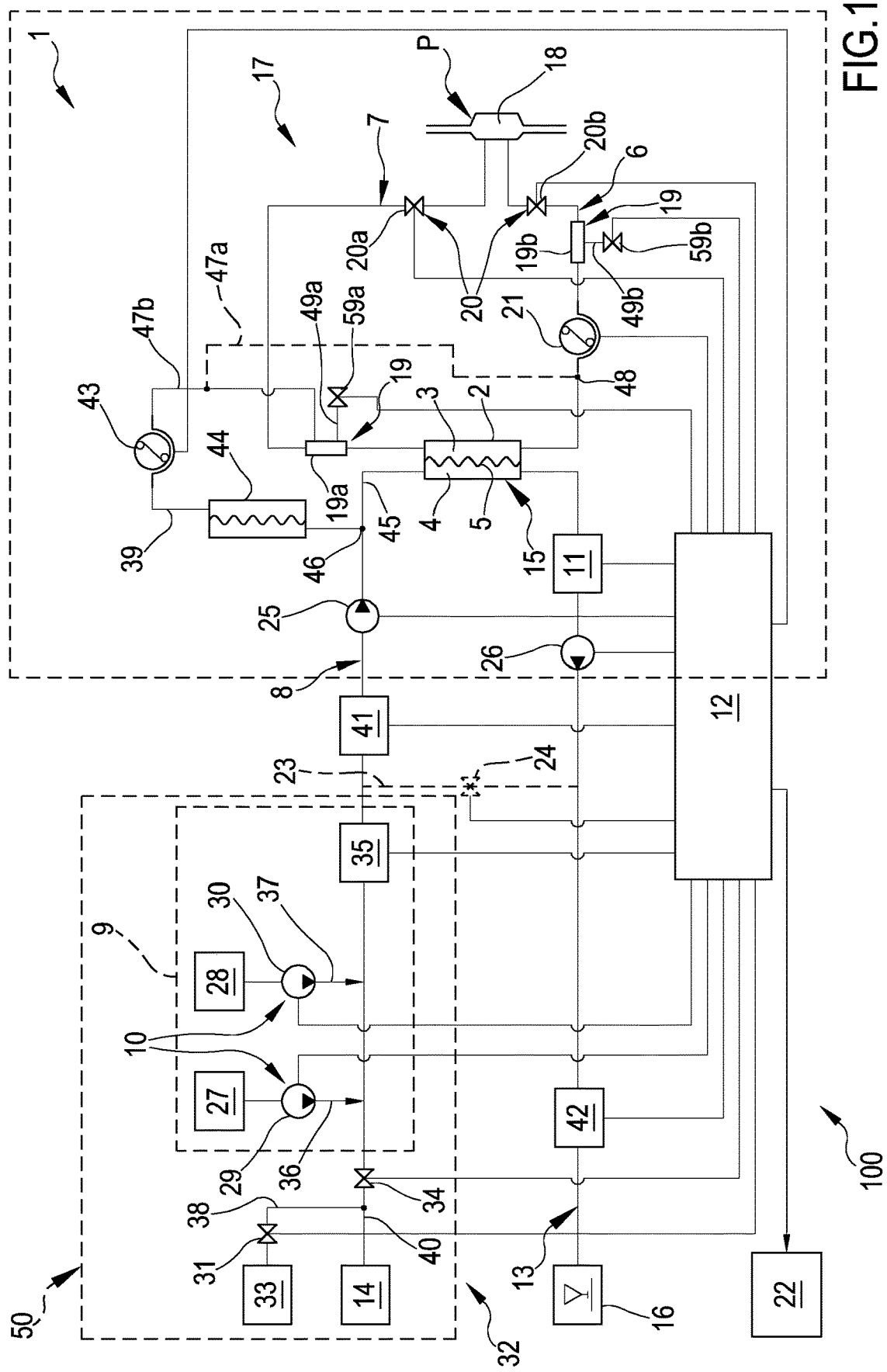
FIG. 1 is a schematic view of a blood treatment apparatus according to a generic embodiment of the present invention.

FIG. 1 illustrates an extracorporeal blood treatment apparatus 1 according to a generic embodiment. An example of a hydraulic circuit 100 is also schematically illustrated, but it is to be noted that the specific structure of the hydraulic circuit 100 is not relevant for the purposes of the present invention and therefore other and different circuits to those specifically shown in FIG. 1 might be used in consequence of the functional and design needs of each single medical apparatus.

The hydraulic circuit 100 exhibits a dialysis fluid circuit 32 presenting at least one dialysis fluid supply line 8. Depending on the apparatus treatment mode, the dialysis fluid supply line 8 may or, may not, assume different hydraulic circuit line configurations.

In a hemodialysis (HD) treatment mode, the supply line 8 is destined to transport a dialysis fluid from at least one source 14 towards a treatment station 15 where one or more filtration units 2, or dialyzers, operate. Dialysis fluid and blood exchange through the semipermeable membrane 5 in the filtration unit 2 mainly by diffusion process. In a hemofiltration (HF) treatment mode, the supply line 8 comprises an infusion line 39, which is destined to transport an infusion fluid from at least one source 14 to the blood circuit. The infusion line 39 may include an ultrafilter 44 to additionally filter the received fluid upstream the injection point into the blood circuit. The removal of waste products from the blood is achieved by using large amounts of ultrafiltration with simultaneous reinfusion of sterile replacement fluid in the blood circuit. In a hemodiafiltration (HDF) treatment mode, the supply line 8 is destined to transport the dialysis fluid from the source 14 towards the treatment station 15 and also comprises the infusion line 39 to transport the infusion fluid from the source 14 to the blood circuit 17. HDF is a combination of hemodialysis and hemofiltration.

In general, though not essential, the source 14 for the supply line 8 and the infusion line 39 is the same (i.e. a dialysis fluid preparation devices 9). Of course, different sources may be used. Additionally, the supply line 8 normally branches into the infusion line 39, infusing fluid in the blood circuit 17, and into an inlet line 45 directing the fluid to the treatment station 15. Referring to FIG. 1, a branch point is indicated with reference numeral 46.

Notwithstanding the fact that different hydraulic circuits 100 may be used to deliver HF, HD and HDF treatments having exclusively the relevant lines for the specific treatment (e.g. no infusion line 39 for HD, no inlet line 45 for HF), generally the hydraulic circuit 100 is of the kind shown in FIG. 1 and includes both infusion line 39 and inlet line 45, wherein an apparatus control unit 12 may then control the passage of fluid trough said lines, depending on the selected treatment, through e.g. proper valves or clamps.

The dialysis fluid circuit 32 further comprises at least one dialysis effluent line 13, destined for the transport of a dialysate liquid (spent dialysate and liquid ultrafiltered from the blood through a semipermeable membrane 5) from the treatment station 15 towards an evacuation zone, schematically denoted by 16 in FIG. 1.

The hydraulic circuit cooperates with a blood circuit 17, also schematically represented in FIG. 1 in its basic component parts. The specific structure of the blood circuit is also not fundamental, with reference to the present invention. Thus, with reference to FIG. 1, a brief description of a possible embodiment of a blood circuit is made, which is however provided purely by way of non-limiting example.

Figure 6:
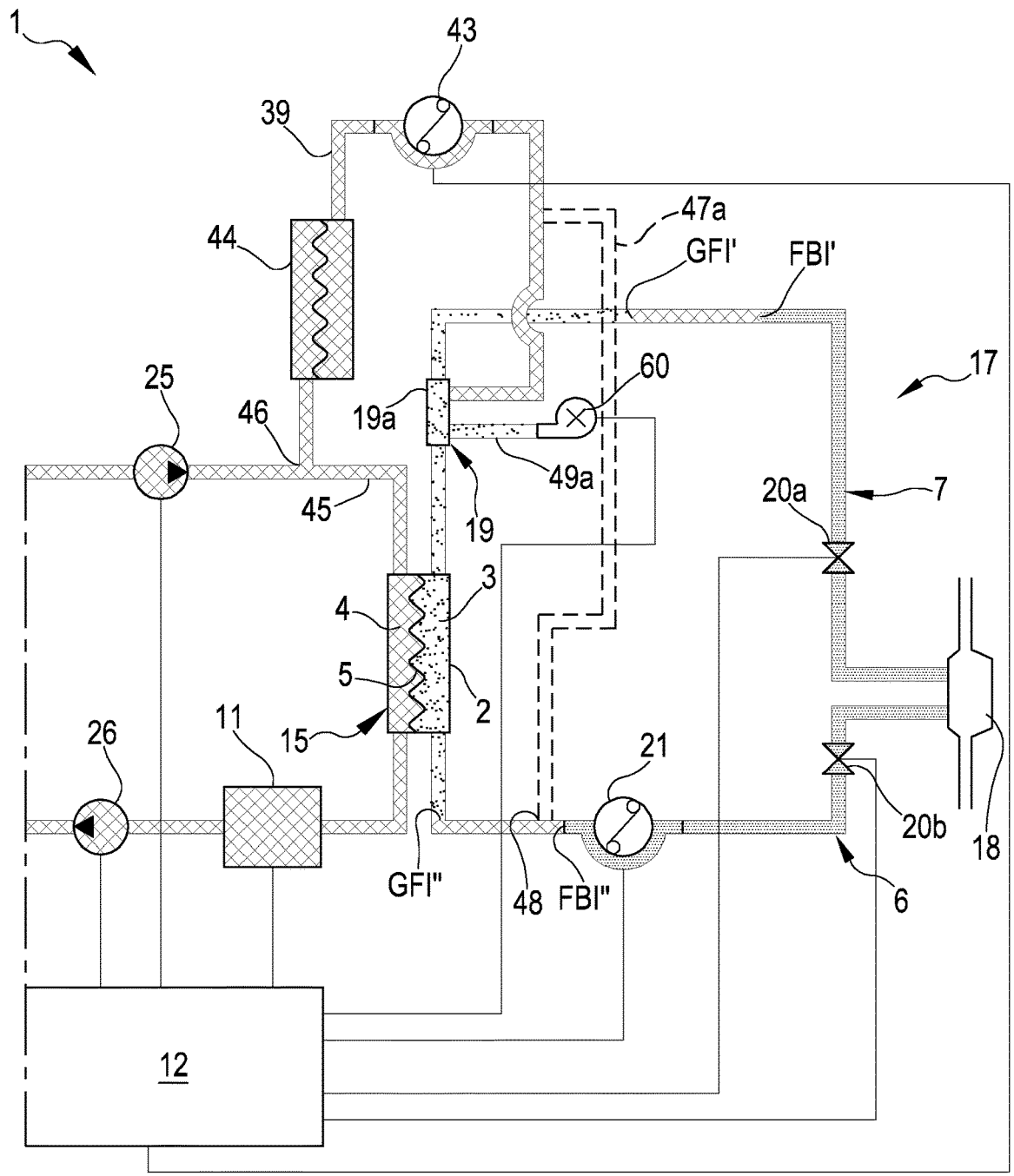
FIG. 6 is a magnified schematic view of a blood treatment apparatus according to a further embodiment of the present invention during a gas infusion step.

The blood circuit 17 of FIG. 1 comprises a blood withdrawal line 6 designed to remove blood from a vascular access 18 and a blood return line 7 designed to return the treated blood to the vascular access 18. The blood circuit 17 of FIG. 1 further comprises a primary chamber 3, or blood chamber, of the blood filtration unit 2, while a secondary chamber 4 of the blood filtration unit 2 is connected to the hydraulic circuit 100. In greater detail, the blood withdrawal line 6 is connected at the inlet of the primary chamber 3, while the blood return line 7 is connected at the outlet of the primary chamber 3. In an embodiment, the blood return line 7 and/or the blood withdrawal line 6 are made of transparent material, so that a fluid flowing inside the lines might be visible from the outside: i.e. the blood lines might be made of plastic or PVC or silicone transparent material. In turn, the dialysis fluid supply line 8 is connected at the inlet of the secondary chamber 4, while the dialysis effluent line 13 is connected at the outlet of the secondary chamber 4. The filtration unit 2, for example a dialyzer or a plasma filter or a hemofilter or a hemodiafilter, comprises, as mentioned, the two chambers 3 and 4 which are separated by a semipermeable membrane 5, for example of the hollow-fiber type or plate type. The blood circuit 17 may also comprise one or more air separators 19: in particular, as shown in FIG. 1, the apparatus comprises an air separator 19*a* on the blood return line 7 and an auxiliary air separator 19*b* on the blood withdrawal line 7. Anyhow, the apparatus may comprise, as shown in FIGS. 6, 7, 8, a single air separator 19*a* arranged on the blood return line 7: anyhow, an apparatus having a single air separator 19*b* arranged on the blood withdrawal line 6 is non precluded.

Figure 7:
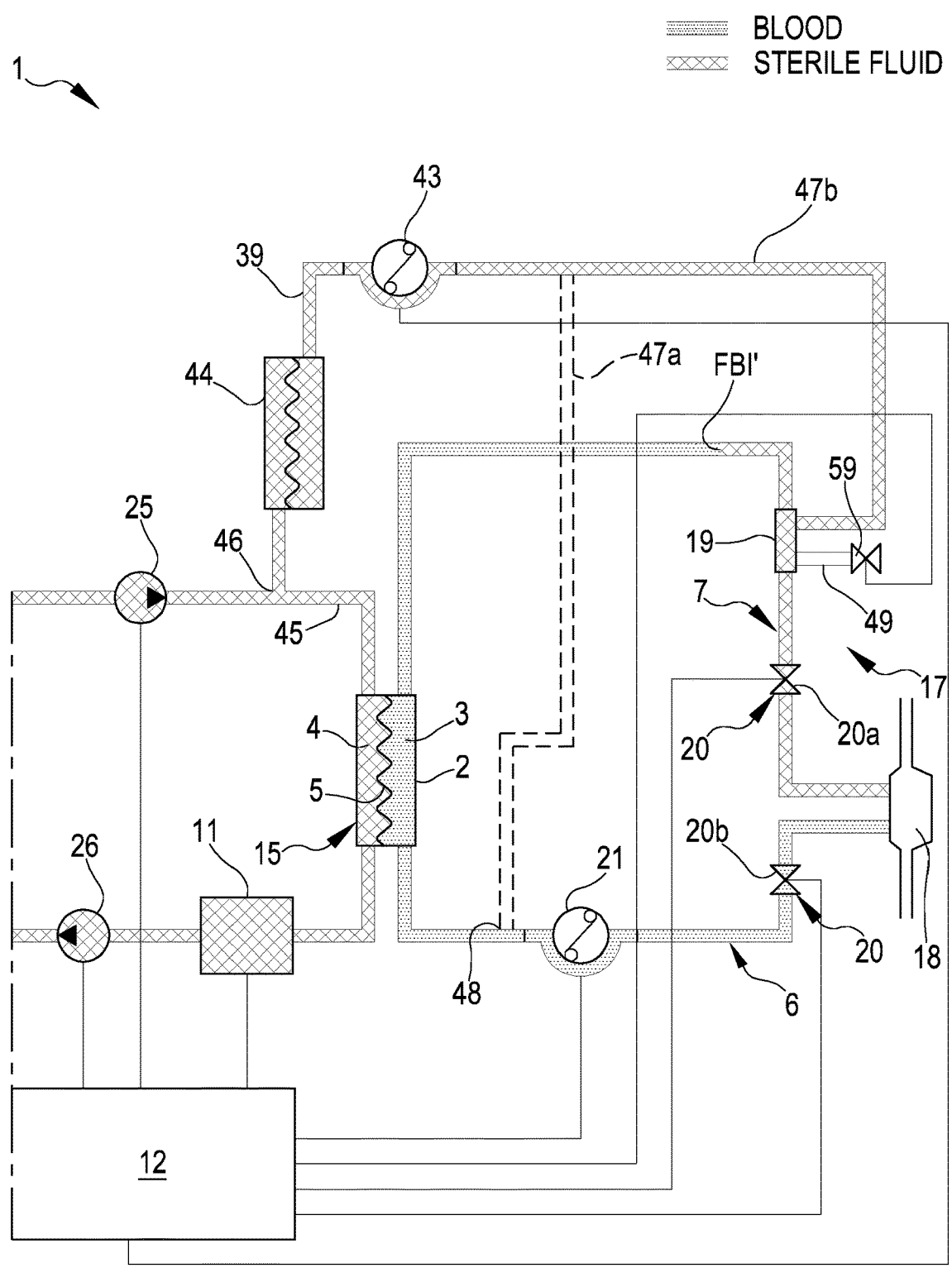
FIG. 7 is a magnified schematic view of a blood treatment apparatus according to a further embodiment of the present invention during a sterile fluid infusion step.
Figure 8:
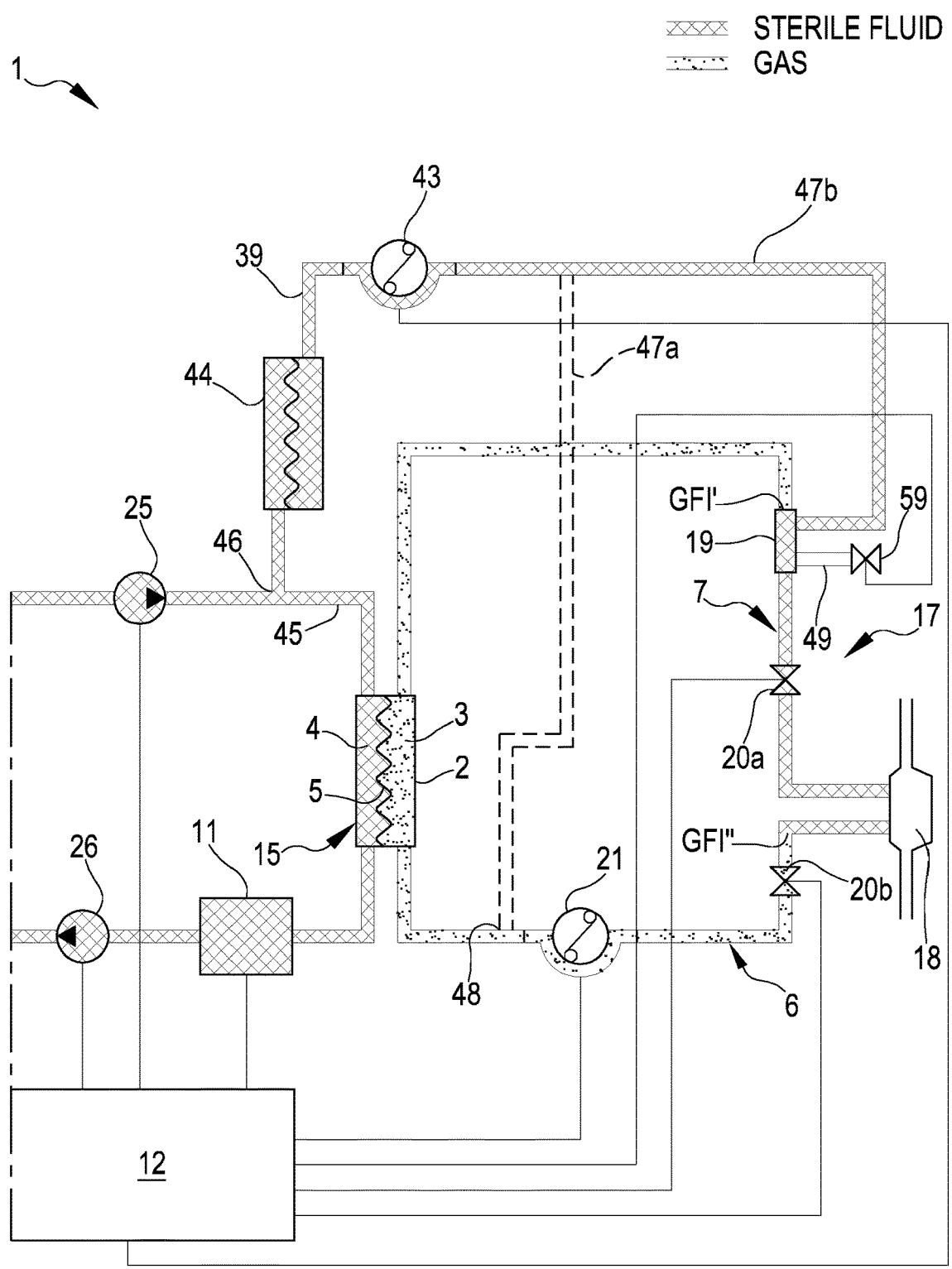
FIGS. 8 and 9 are magnified schematic views of a blood treatment apparatus according to a further embodiment of the present invention during a gas infusion step.
Figure 9:
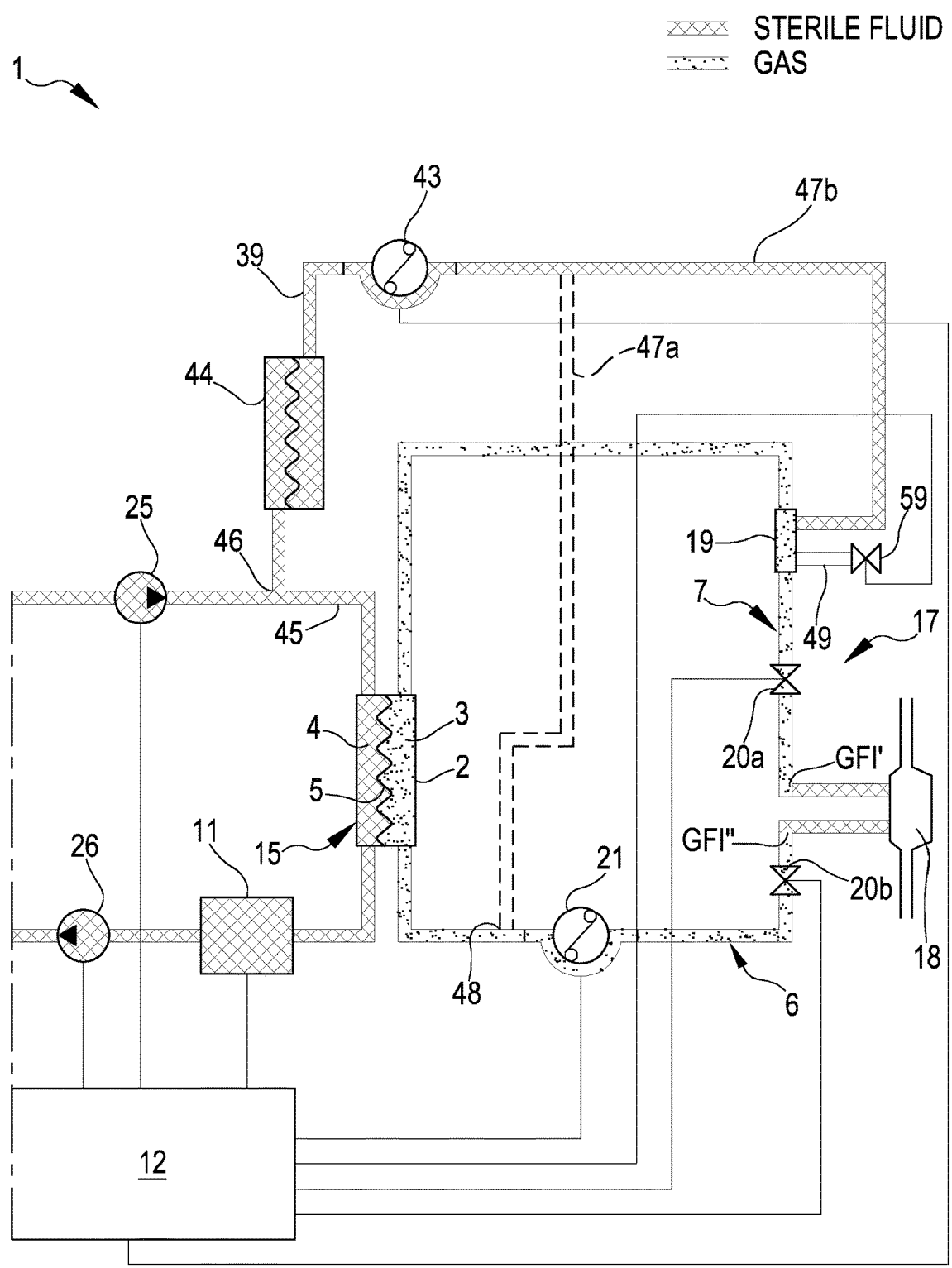

According to an embodiment of an apparatus as shown in figures from 1 to 6, the air separator 19*a* of the blood return line 7 is arranged close to the filtration unit 2: according to another embodiment, an air separator 19 of the return line 7 and/or of the withdrawal line 6 may also be arranged at a different location, e.g., as close as possible to the second ends of, respectively, the return line 7 and/or of the withdrawal line 6 as shown in FIGS. 7 and 8. The blood circuit 17 defines a blood circuit inner volume sum of at least an inner volume of the blood withdrawal line 6, the blood return line 7, the primary chamber 3 of the filtration unit 2, the air separator 19, in particular the air separator 19*a* and the auxiliary air separator 19*b*.

The apparatus further comprises safety clamps 20 arranged close to the vascular access 18 of the patient: in particular the apparatus may comprise a return blood safety clamp 20*a* and a withdrawal blood safety clamp 20*b* respectively arranged on the blood return line 7 and on the blood withdrawal line 6. According to a blood flow direction, assumed during a dialysis treatment, from the blood withdrawal line 6, through the filter unit 2 and towards the blood return line 7, the blood return safety clamp 20*a* is arranged downstream with respect to the air separator 19*a*, and the blood withdrawal safety clamp 20*b* is arranged upstream with respect to the auxiliary air separator 19*b*. The safety clamps 20 may be activated by the control unit (or manually) to close the blood return line 7 when, for example for safety reasons, the blood return to the vascular access 18 has to be closed.

The extracorporeal blood treatment apparatus 1 may also comprise one or more blood pumps 21, for example positive displacement pumps such as peristaltic pumps: in the example of FIG. 1, a blood pump 21 is arranged on the blood withdrawal line 6, in particular interposed between the filter unit 2 and the auxiliary air separator 19*b*. In a further embodiment, more than one blood pump 21 may be arranged on the blood circuit 17, for example a first blood pump arranged on the withdrawal line 6 and a second blood pump arranged on the return line 7. The blood return line 7 extends between a first end, connected to an outlet of the primary chamber 3 of the filtration unit 2, and a second end for connection to the patient: analogously, the blood withdrawal line 6 extends between a first end, connected to an inlet of the primary chamber 3 of the filtration unit 2, and a second end for connection to the patient. According to an embodiment of the apparatus as shown in the attached figures, the air separator 19*a* is arranged on the blood return line 7 and interposed between the first and the second end of the blood return line 7. The auxiliary air separator 19*b* is arranged on the blood withdrawal line 6 and interposed between the first and the second ends of the blood withdrawal line 6: more in detail, the auxiliary air separator is interposed between the blood pump 21 and the blood withdrawal safety clamp 20*b*.

The apparatus of above-described embodiment may also comprise a user interface 22 (e.g. a graphic user interface or GUI) and a control unit 12, i.e. a programmed/programmable control unit, connected to the user interface. The control unit 12 may, for example, comprise one or more digital microprocessor units or one or more analog units or other combinations of analog units and digital units. Relating by way of example to a microprocessor unit, once the unit has performed a special program (for example a program coming from outside or directly integrated on the microprocessor card), the unit is programmed, defining a plurality of functional blocks which constitute means each designed to perform respective operations as better described in the following description.

In combination with one or more of the above characteristics, the medical apparatus may also comprise a closing device operating, for example, in the blood circuit 17 and/or in the dialysis fluid circuit 32 and commandable between one first operating condition, in which the closing device allows a liquid to flow towards the filtration unit 2, and a second operative position, in which the closing device blocks the passage of liquid towards the filtration unit 2. In this case, the control unit 12 may be connected to the closing device and programmed to drive the closing device to pass from the first to the second operative condition, should an alarm condition have been detected. The closing device may comprise a bypass line 23 which connects the dialysis fluid supply line 8 and the dialysate effluent line 13 bypassing the dialyzer, and one or more fluid check members 24 connected to the control unit 12 for selectively opening and closing the bypass line 23. The components (bypass line 23 and fluid check members 24), which may be alternative or additional to the presence of the safety clamps 20, are represented by a broken line in FIG. 1. The check members 24 on command of the control unit close the fluid passage towards the treatment zone and connect the source 14 directly with the dialysis effluent line 13 through the bypass line 23. Again with the aim of controlling the fluid passage towards the filtration unit 2, a fluid dialysis pump 25 and a dialysate pump 26 may be included, located respectively on the dialysis fluid supply line 8 and on the dialysate effluent line 13 and also operatively connected to the control unit 12.

The apparatus also comprises a dialysis fluid preparation device 9 which may be of any known type, for example including one or more concentrate sources 27, 28 and respective concentrate pumps 29, 30 for the delivery, as well as at least a conductivity sensor 35. Of course other kinds of dialysis fluid preparation devices 9 might be equivalently used, having a single or further concentrate sources and/or a single or more pumps. Since the dialysis apparatus may comprise various liquid sources 14 (for example one or more water sources, one or more concentrate sources 27, 28, one or more sources 33 of disinfectant liquids) connected to the dialysis fluid supply line 8 with respective delivery lines 36, 37 and 38, the apparatus may exhibit, at each delivery line, a respective check member (not all are shown) and, for example, comprising a valve member 31 and 34 and/or an occlusive pump.

The preparation device 9 may be any known system configured for on-line preparing dialysis fluid from water and concentrates. The dialysis fluid supply line 8 fluidly connects the preparation device 9 for preparing dialysis fluid to the filtration unit 2 and/or to the blood circuit 17. As shown, the dialysis fluid supply line 8 connects the preparation device 9 for preparing dialysis fluid to the filtration unit 2 and comprises a main line 40 whose upstream end is intended to be connected to a source 14 of running water. Delivery line/s 36/37 is/are connected to this main line 40, the free end of which delivery line/s is/are intended to be in fluid communication (for example immersed) in a container/s 27, 28 for a concentrated saline solution each containing sodium chloride and/or calcium chloride and/or magnesium chloride and/or potassium chloride. Concentrate pump/s 29, 30 is/are arranged in the delivery line/s 36/37 in order to allow the metered mixing of water and concentrated solution in the main line 40. The concentrate pump/s 29, 30 is/are driven on the basis of the comparison between 1) a target conductivity value for the mixture of liquids formed where the main line 40 joins the delivery line/s 36/37, and 2) the value of the conductivity of this mixture measured through a conductivity sensor 35 arranged in the main line 40 immediately downstream of the junction between the main line 40 and the delivery line/s 36/37. Therefore, as mentioned, the dialysis fluid may contain, for example, ions of sodium, calcium, magnesium, and potassium and the preparation device 9 may be configured to prepare the dialysis fluid on the basis of a comparison between a target conductivity value and an actual conductivity value of the dialysis fluid measured by the conductivity sensor 35 of the device 9. The preparation device 9 comprises regulating means 10, of a known type (i.e. concentrate pump/s 29, 30), which is configured to regulate the concentration of a specific substance, in particular an ionic substance, in the dialysis liquid. Generally it is common to control the sodium concentration of the dialysis fluid. The dialysis fluid supply line 8 forms an extension of the main line 40 of the preparation device 9 for preparing dialysis fluid. Arranged in this dialysis fluid supply line, in the direction in which the liquid circulates, there are the first flow meter 41 and the dialysis fluid pump 25. The supply line 8 branches (at branch point 46) into the infusion line 39, which, in the example of FIG. 1, is shown directly connected to the blood return line 7, in particular to the air separator 19 (solid line) via post infusion tract 47b.

Alternatively, the infusion line 39 may infuse infusion fluid in the blood withdrawal line 6 via pre-infusion tract 47a, in particular downstream the blood pump 21 (dotted line) at pre-infusion point 48. According to an embodiment, the infusion line 39 may be connected to the blood return line 7 at the air separator 19a: alternatively or in combination, the infusion line 39 may also be connected to the blood withdrawal line 6 either downstream the blood pump 21 (as shown) or at the auxiliary air separator 19b. It is also in the scope of the present description an embodiment including an infusion line 39 branching into a pre-infusion branch 47a and in a post infusion branch 47b directing infusion fluid, respectively, in the blood withdrawal line 6 and in the blood return line 7. One or more infusion pumps 43 may be used to pump the desired flow of infusion fluid into the blood circuit. The infusion pump 43 may be a positive displacement pump (e.g. a peristaltic pump as shown) or any other pump adapted to displace infusion fluid (e.g. a volumetric pump). The dialysis effluent line 13 may be provided with a dialysate pump 26 and a second flow meter 42. The first and second flow meters 41, 42 may be used to control (in a known manner) the fluid balance of a patient connected to the blood circuit 17 during a dialysis session.

A sensor 11 is provided on the dialysis effluent line 13, immediately downstream the filtration unit 2, to measure a parameter value of the dialysate in the dialysate effluent line. In detail, the parameter of the dialysate, which is measured by the sensor 11 is at least one chosen in the group consisting of conductivity of the dialysate, a conductivity-related parameter of the dialysate, concentration of at least a substance in the dialysate and a concentration-related parameter of at least a substance in the dialysate. In detail the sensor 11 is a conductivity sensor, which is connected to the dialysis effluent line 13, and is configured to detect conductivity values of the dialysate downstream of the filtration unit 2. Alternatively (or in combination) sensor 11 may include a concentration sensor configured for measuring the concentration of at least one substance in the dialysate, such as sodium concentration. Correspondingly, sensor 35 on the dialysis fluid supply line may differently include a concentration sensor configured for measuring the concentration of at least one substance in the dialysis fluid, such as sodium concentration. The control unit 12 of the dialysis apparatus represented in FIG. 1 may be connected to a (graphic) user interface 22 through which it may receive instructions, for example target values, such as blood flow rate $Q_b$, dialysis fluid flow rate $Q_{dl}$, infusion liquid flow rate $Q_{inf}$ (pre infusion and/or post infusion), patient weight loss WL. The control unit 12 furthermore may receive detected values by the sensors of the apparatus, such as the aforementioned flow meters 41, 42, the (e.g. conductivity) sensor 35 of the preparation device 9 and the (e.g. conductivity) sensor 11 in the dialysis effluent line 13. On the basis of the instructions received and the operating modes and algorithms which have been programmed, the control unit 12 drives the actuators of the apparatus, such as the blood pump 21, the aforementioned dialysis fluid and dialysate pumps 25, 26, and the preparation device 9, and the infusion pump 43.

The apparatus may also comprise one or more gas inlets 49 arranged on the blood return line 7 and/or on the blood withdrawal line 6 and configured to allow gas, in particular air, to enter into the blood circuit 17. The gas inlet comprises an intercepting element 59, define i.e. by a valve or a clamp, movable between an open position and a closed position to respectively allow or prevent gas or fluid to pass through. The intercepting element 59 is further connected to the control unit 12 which is configured to command the intercepting element 59 selectively in the open or in the closed position. In an embodiment, the apparatus 1 may comprise one gas inlet 49, namely a first gas inlet 49a, as shown in figures from 6 to 8 and arranged on the blood return line 7 interposed between the filter unit 2 and the blood return safety clamp 20a: alternatively a single first gas inlet 49a may be arranged on the blood withdrawal line 6 (embodiment not shown). The first gas inlet 49a is associated to a respective first intercepting element 59a movable between an open and a closed position to control gas transit. In another embodiment, the apparatus 1 may comprise the first gas inlet 49a on the blood return line 7 and a second gas inlet 49b arranged on the blood withdrawal line 6 interposed between the blood pump 21 and the blood withdrawal safety clamp 20b. The second gas inlet 49b is also associated to a respective second intercepting element 59b movable between an open and a closed position to control gas or fluid transit. The apparatus 1 may also comprise a gas supply unit 60 fluidly connected to the one or more gas inlets 49 and configured to forcedly infuse gas, i.e. air, into the blood circuit 17 through the gas inlet 49, i.e. through the first gas inlet 49a or the second gas inlet 49b. The gas supply unit 60 may be a compressor or a pump configured to provide a gas pressurized into the blood circuit 17 through the respective gas inlet: the control unit 12 is configured to control activation, arrest or modulation of the gas supply unit 60. In the embodiments shown in the attached figure, the gas inlets 49 may be arranged at the air separator 19; more in detail, the first gas inlet 49a may be arranged at the air separator 19a of the blood return line 7 and the second gas inlet 49b may be arranged at the auxiliary air separator 19b of the blood withdrawal line 6. Moreover, also the respective intercepting element 59a, 59b may be arranged at the air separators 19 as well. The apparatus shown in FIG. 1 shows a particular embodiment wherein the infusion line 39, the first gas inlet 49a and the first intercepting element 59a are all arranged at the air separator 19a of the return line 7. Analogously, the second gas inlet 49b and the second intercepting element 59b are arranged at the auxiliary air separator 19b of the withdrawal line 6: it is not excluded that the infusion line 39 may be connected to the auxiliary air separator 19b of the withdrawal line 6. The apparatus may also comprise a gas inlet arrange on the fluid circuit 32 and configured to allow gas to enter into the fluid circuit 32. The gas inlet may be arranged on the dialysis fluid supply line 8 and/or on the effluent line 13. The fluid circuit also comprises an intercepting element connected to the gas inlet of the fluid circuit 32, wherein this intercepting element (not shown in the attached figures) is movable between an open and a closed position to respectively allow or prevent gas to enter into the fluid circuit 32. The intercepting element of the fluid circuit 32 may be connected to the control unit 12 which is configured to command it in the open or in the closed position. The fluid circuit 32 may also comprise a gas supply unit fluidly (not shown in the attached figures) connected to the gas inlet of the fluid circuit 32 and configured to infuse gas into the fluid circuit 32. The apparatus may further comprise a gas sensor, in particular associated to the filtration unit 2, configured to provide a signal representative of the presence of gas and/or of the amount of gas included into the secondary chamber 4 of the filtration unit 2: the gas sensor may be for example a weight sensor, or a level sensor of the dialysis fluid present into the secondary chamber 4 of the filtration unit 2.

As already mentioned, the described embodiments are intended to be non-limiting examples. In particular the circuits of FIG. 1 should not be interpreted as defining or limiting, as an apparatus such as in the invention may comprise other additional or alternative components to those described. For example an ultrafiltration line may be included, with at least one respective pump connected to the dialysis effluent line 13. The blood circuit of FIG. 1 is intended for double needle treatments; however, this is a non-limiting example of the blood set. Indeed, the apparatus may be configured to perform single needle treatments, i.e. the patient is connected to the extracorporeal blood circuit by way of a single needle and the extracorporeal line from the patient is then split into a withdrawal line and a return line, using, for example, an 'Y' connector. During single needle treatment, a blood withdrawal phase removing blood from patient is alternated to a blood return phase in which blood is restituted to the patient. Furthermore one or more devices for measuring specific substance concentrations might be implemented either (or both) in the dialysis fluid side or (and) in the blood side of the hydraulic circuit. Concentration of calcium, potassium, magnesium, bicarbonate, and/or sodium might be desired to be known. Finally, the above-cited one or more pumps and all the other necessary temperature, pressure, and concentration sensors may operate either on the dialysis fluid supply line 8 and/or on the dialysis effluent line 13, in order to adequately monitor the preparation and movement of the liquid in the hydraulic circuit. Given the above description of a possible embodiment of extracorporeal blood treatment apparatus, thereafter the specific working of the apparatus and the algorithm programming the control unit are described.

Blood Restitution (and Emptying) Procedure

The apparatus 1, and in particular the blood circuit 17 is, during an extracorporeal blood treatment, filled with blood which is withdrawn from the patient through the blood withdrawal line 6, treated in the filter unit 2, and then returned to the patient through the blood return line 7: therefore, at the end of the extracorporeal blood treatment, the blood circuit 17 is still filled with a significant amount of residual blood of the patient. The apparatus 1 described above is configured to perform, at the end of an extracorporeal blood treatment and before disconnecting the patient, a blood restitution procedure which consists in restituting to the patient the residual blood present into the blood circuit 17. Therefore, the patient needs to be connected to the apparatus through at least one blood line. Here after steps of the blood restitution procedure are described according to different embodiments: these steps define a method of blood restitution or are to be considered as performed by the control unit 12 of the apparatus. The attached figures from 2 to 8 show a portion of the whole hydraulic circuit 100 in order to magnify the blood circuit 17 and part of the fluid circuit 32. These figures show different steps wherein sterile fluid, gas and blood transit within the lines according to the blood restitution procedure: therefore, different patterns are plot on the drawings for differentiating blood, fluid and gas. The legend associating each pattern with blood, sterile fluid and gas is shown in the attached figures. Patterns are consistent throughout all the figures. The blood restitution procedure comprises a step of infusing a predetermined amount of sterile fluid from the supply source 50 into the blood circuit 17, as shown in FIGS. 2, 2a and 7, wherein the sterile fluid may be a replacement fluid, dialysis fluid or saline.

Figure 2:
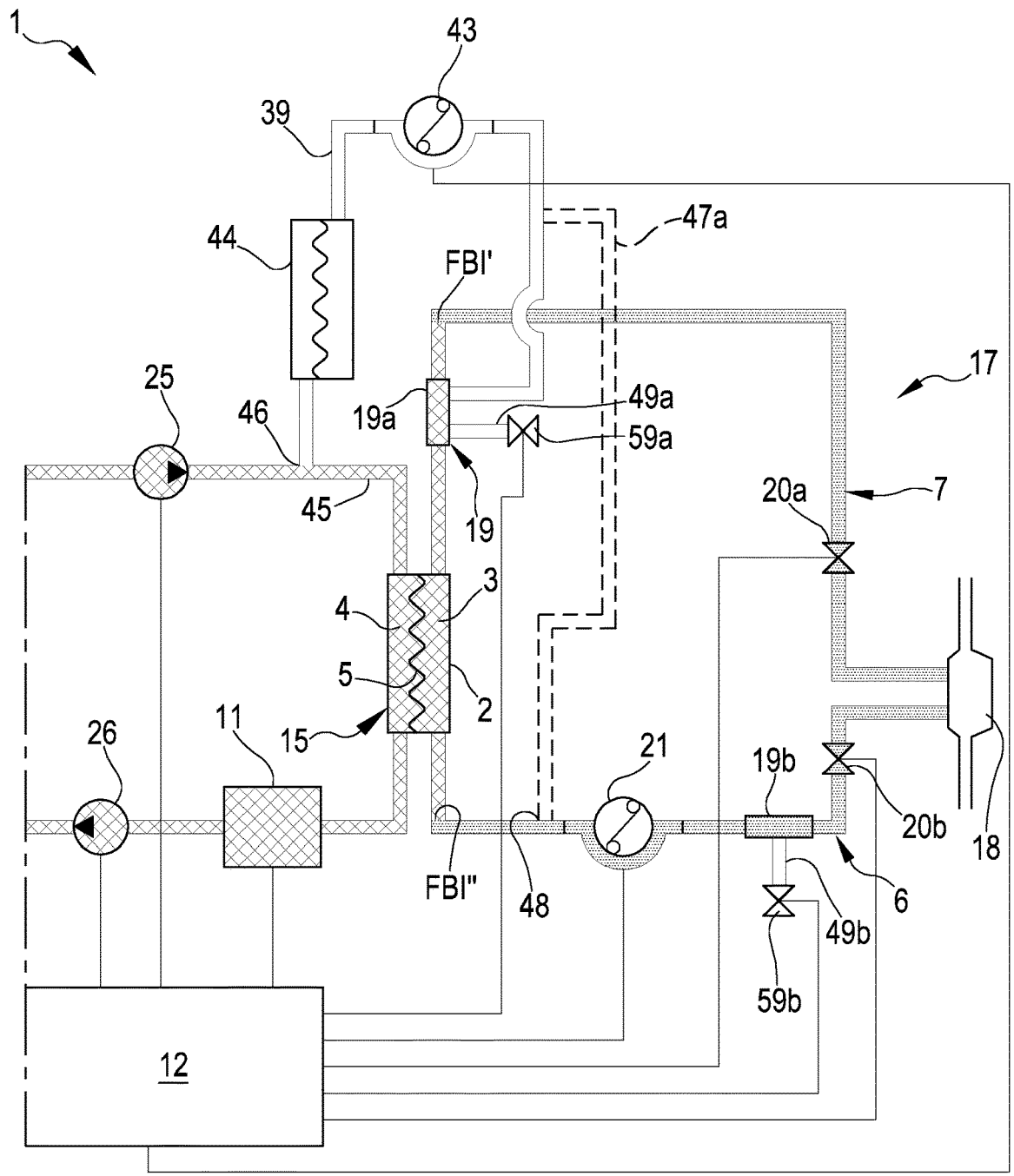
FIGS. 2 and 2a are magnified schematic views of a blood treatment apparatus according to an embodiment of the present invention during a sterile fluid infusion step into the blood circuit.

According to an embodiment shown in FIG. 2, this sterile fluid infusing step comprises back-filtering the dialysis fluid through the semi-permeable membrane 5 of the filtration unit 2 into the blood circuit 17: the back filtration is determined by activation of the dialysis fluid pump 25 of the fluid circuit 32 to cause overpressure in the second chamber 4 of the filtration unit 2, so that dialysis fluid is caused to pass through the membrane 5 and enter into the blood circuit 17. The step of back filtering may also comprise occluding, or reducing the fluid flow, through the fluid effluent line 13, so that the dialysis fluid is forced to pass through the membrane 5: to occlude or reduce the fluid flow through the fluid effluent line 13 the control unit 12 may command the dialysate pump 26 to stop or to work at a flow rate lower than the one determined by the dialysis fluid pump 25. Alternatively, an occlusive clamp may be arranged, or commanded by the control unit 12, on the effluent line 13 to prevent fluid flow. In other terms, an over pressure is generated in the second chamber 4 of the filtration unit, wherein this over pressure has to be sufficient to cause the dialysis fluid to enter into the blood circuit 17 and push at least part of the residual blood into the patient.

Figure 2A:
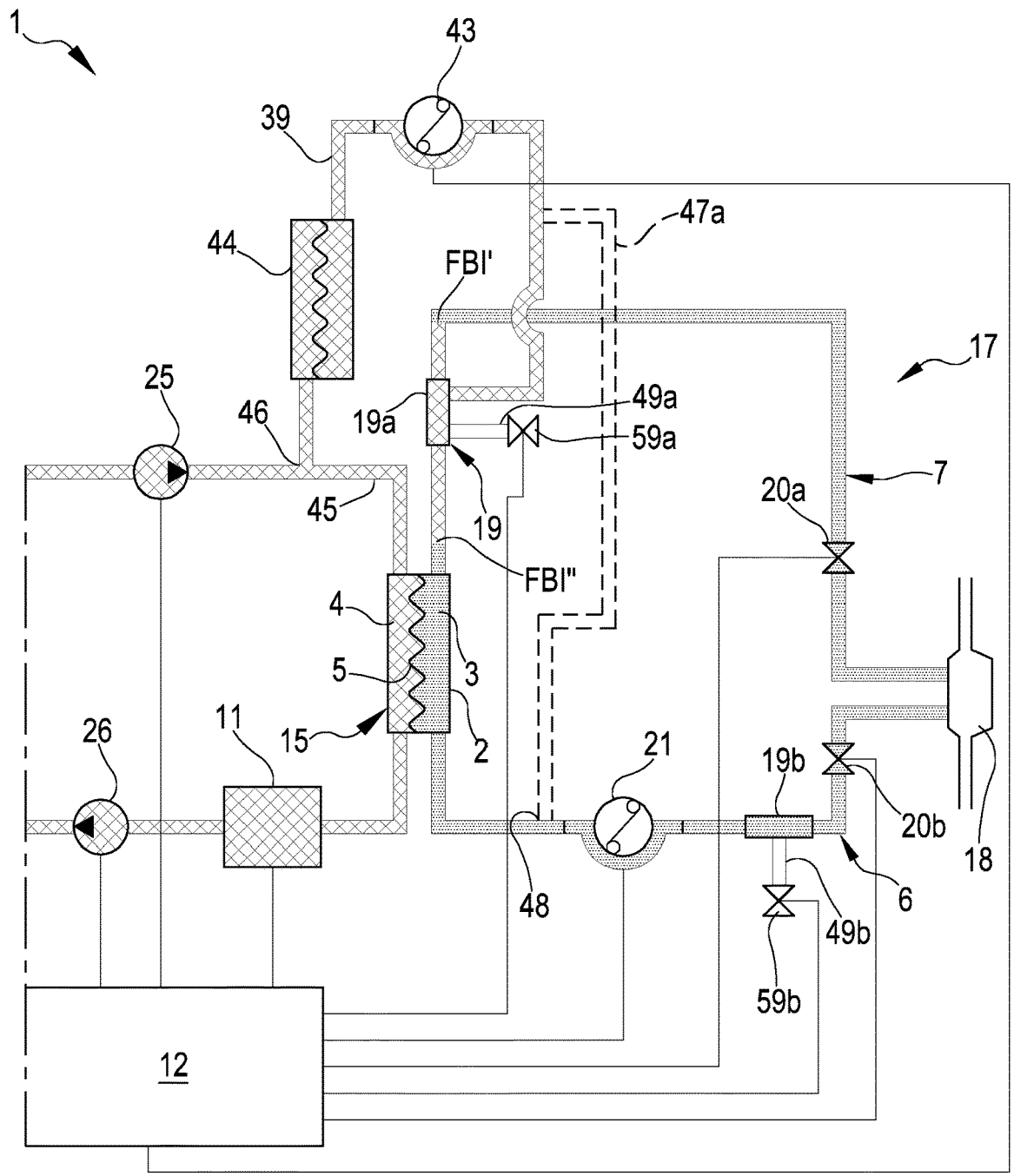

According to an embodiment shown in FIG. 2a, the sterile fluid infusing step implies infusing the sterile fluid through the infusion line 39 into the blood return line 7 or, according to an alternative embodiment not shown, into the blood withdrawal line 6 of the blood circuit 17. Although the attached figures show the infusion line 39 always connected to the blood return line 7, an apparatus wherein the infusion line 39 is connected to the blood withdrawal line 6 or even to both the blood lines may be implemented as well. The infusing step comprises activating the infusion pump 43 operative on the infusion line 39 to determine fluid flow towards the blood circuit 17. In the case the infusion line is connected to the fluid circuit 32, dialysis fluid pump 25 might be also be activated to provide fluid to the infusion line 39: otherwise, the infusion line 39 may receive the sterile fluid from a container or a bag connected to an end of the infusion line 39 and containing the sterile fluid. In this last scenario, the infusion pump 43 may be missing and the flow rate of the infused sterile fluid may be determined by gravity and controlled through a clamp or a valve.

The amount of sterile fluid infused into the blood circuit 17 may be determined, in case of dialysis back filtration, by controlling the dialysis fluid pump 25 and, optionally, also the dialysate pump 26. Otherwise, if the sterile fluid is infused from the infusion line 39, the amount of sterile fluid infused into the blood circuit 17 may be determined by controlling the infusion pump 43: in case the infusion line is connected to a container or to a bag and the infusion pump is missing, the amount of sterile fluid infused into the blood circuit 17 may be determined by monitoring the weight of the container or bag which varies over time as the sterile fluid is infused.

The sterile fluid infusing step, in both cases wherein it is infused by back-filtration or through the infusion line directly in the return or withdrawal lines, implies the need the sterile fluid to reach a location of the gas inlet 49: more in detail, the amount of sterile fluid infused has to be sufficient to reach and pass beyond the location of the gas inlet 49 from which a subsequent gas infusion is allowed. The term "pass beyond" means that, if the sterile fluid enters the blood circuit 17 by back-filtering the membrane 5 of the filtration unit 2, the sterile fluid has to transit through the withdrawal or return lines 6, 7 in a direction towards the gas inlet 49, reach said gas inlet 49, and cross the location of the gas inlet 49, so that the latter is interposed between portions of sterile fluid, as clearly shown in FIGS. 2, 2a and 7. The predetermined amount of sterile fluid is commonly comprised between 50 ml and 200 ml.

The infusing step of sterile fluid into the blood circuit 17 determines at least one fluid-blood interface FBI, wherein the residual blood and the infused sterile fluid face each other. At this interface the blood and the sterile fluid might slightly merge each other: anyhow, an interface between blood and fluid is defined, so that it is irrelevant if the interface is not perfectly sharp. According to the embodiments shown in the attached figures, sterile fluid infusing step defines a first fluid-blood interface FBI', interposed between the infused sterile fluid and the second end of the blood return line 7, and a second fluid-blood interface FBI" interposed between the same infused sterile fluid and the second end of the blood withdrawal line 6.

During the infusing step, the sterile fluid may push part of the residual blood back to the patient or into a buffer container, so that the fluid-blood interface FBI moves within the blood line at least up and beyond the gas inlet 49: in particular, in case the apparatus comprises more than one gas inlets 49, the infusing step implied that at least one between the first and the second FBI', FBI" reaches and goes beyond at least one gas inlet 49. For example, as shown in FIGS. 2 and 2a, although the apparatus is provided with a first and a second gas inlets 49a, 49b, only the first fluid blood interface FBI' has reached and went beyond the first gas inlet 49a.

During the sterile fluid infusion, the intercepting element 59 of the gas inlet 49 is commanded in a closed position, so that no gas is allowed to enter into the blood circuit and no fluid is allowed to exit from the blood circuit. Moreover, according to an embodiment, at least one between the blood return safety clamp 20a and the blood withdrawal safety clamp 20b is arranged in the open position to allow a partial blood restitution during the sterile fluid infusion step. In case the infusion line 39 is in charge of infusing the sterile fluid into the blood circuit 17, the fluid dialysis pump 25 and the dialysate pump 26 are controlled in order to prevent blood or fluid to pass from the primary chamber 3 to the secondary chamber 4 of the filtration unit 2.

Figure 10:
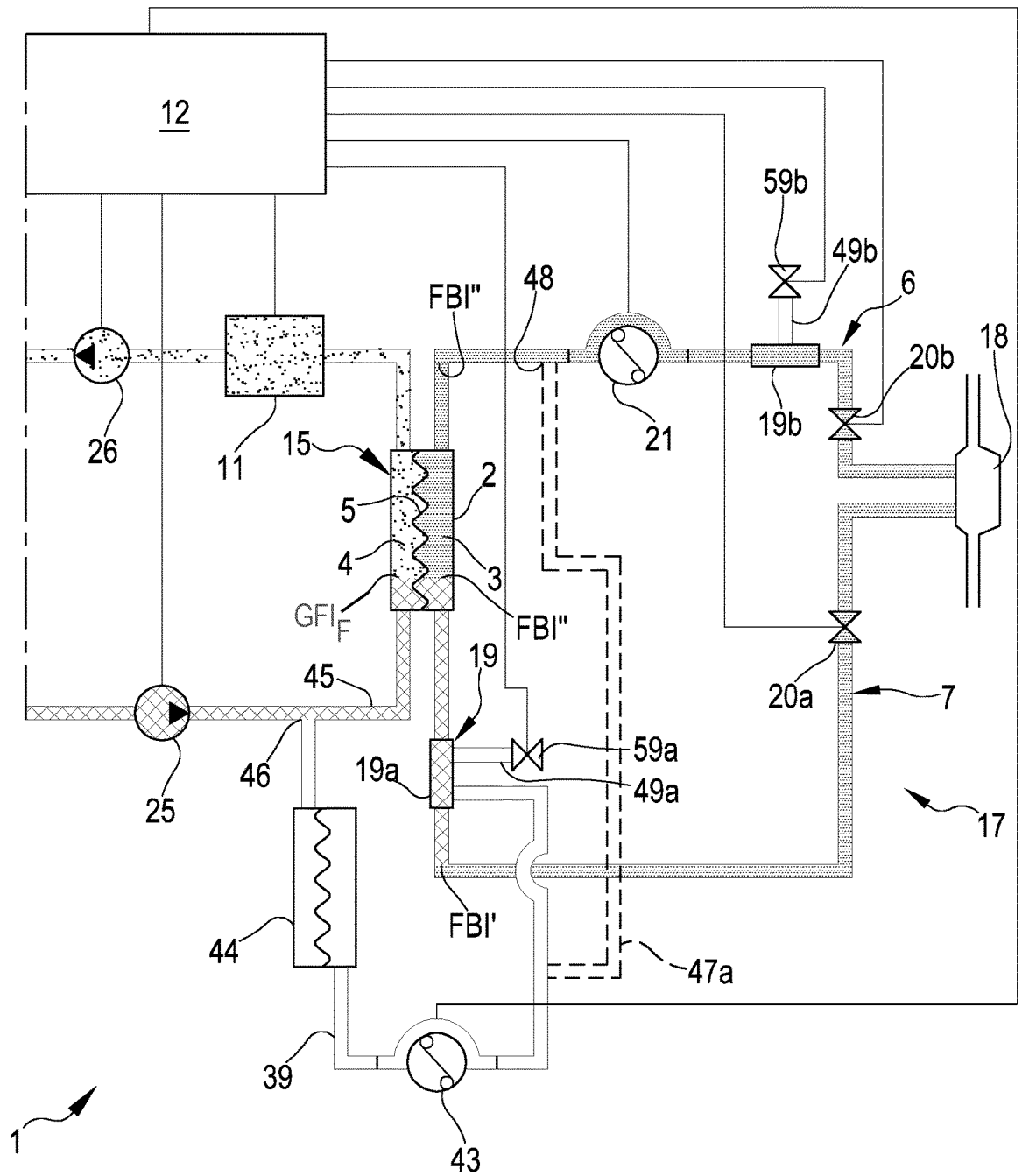
FIGS. 10 and 11 are magnified schematic views of a blood treatment apparatus according to a further embodiment of the present invention.
Figure 11:
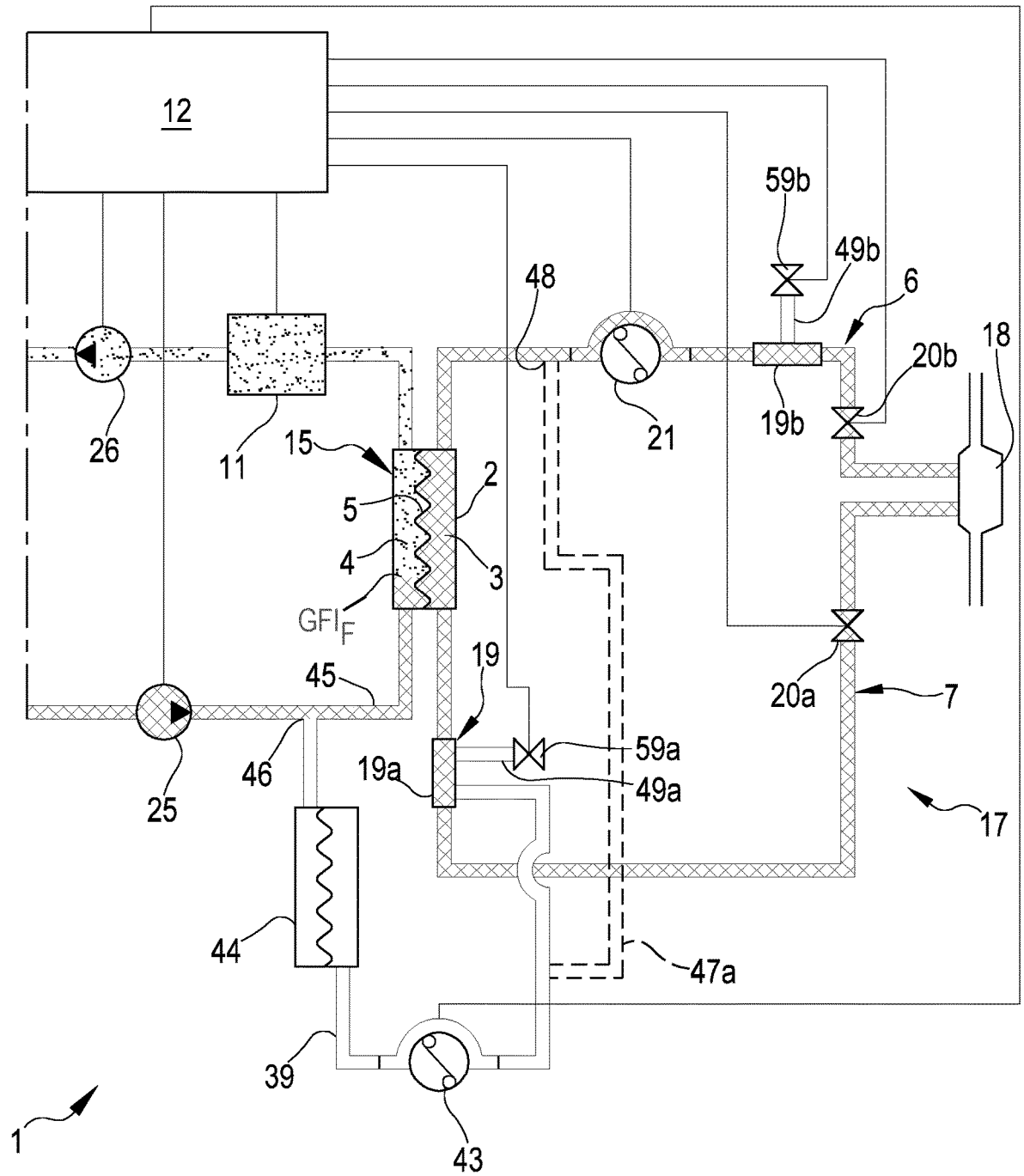

According to a further embodiment shown in FIGS. 10 and 11, the restitution procedure comprises a step, prior to or simultaneous with the step of infusing the sterile fluid into the blood circuit 17, of allowing a predetermined amount of gas to enter into the secondary chamber 4 of the filter unit 2, as shown in FIG. 10. This predetermined amount of gas is defined based on an internal volume of the secondary chamber 4 of the filtration unit 2, in order to partially fill the secondary chamber 4 of the filter unit 2 with gas: in particular the restitution procedure implies to fill with gas at least the 75% of the internal volume of the secondary chamber 4, more in detail at least the 90%. Once the secondary chamber 4 of the filter unit 2 is filled with this predetermined amount of gas, the previously described step of back filtering the membrane 5 with dialysis fluid implies that this fluid is forced to flow from the secondary chamber 4 to the primary chamber 3 only through a reduced surface of the membrane 5, thereby defining an infusion spot of sterile fluid into the blood circuit 17. This allows to reduce significantly dilution of blood with sterile fluid during the step of infusing/back-filtering the sterile fluid into the blood circuit 17: indeed, if sterile fluid is infused by back filtering the whole surface of the membrane 5, the blood housed into the primary chamber 3 will be diluted by the sterile fluid, thereby decreasing sharpness of the fluid-blood interface FBI. On the other hand, if the sterile fluid is back filtered through a reduced surface of the membrane 5, the amount of blood diluted by the sterile fluid will be significantly lower, thereby increasing sharpness of the fluid-blood interface FBI in the blood circuit.

In other terms, the restitution procedure may imply that the secondary chamber 4 is filled with both gas and sterile fluid, in particular dialysis fluid, wherein the amount of gas inside the secondary chamber 4 is higher in volume than the amount of sterile fluid. In particular the volume of the secondary chamber 4 is filled, during the restitution procedure, by gas for the 75%, more in particular for the 90%, while the remaining volume of the secondary chamber 4 is filled with sterile fluid.

The apparatuses shown in FIGS. 10 and 11 is inverted upside down with respect to the apparatuses shown in FIGS. 1-9: in particular the arrangement of the apparatus as shown in FIGS. 10 and 11 represents an embodiment wherein the inlet of the secondary chamber 4 connected to the dialysis supply line 8 is located at a lower level with respect to the outlet of the secondary chamber 4 connected to the dialysis effluent line 13. In more detail, gravity acceleration according to the apparatus of FIGS. 10 and 11 is directed from up to down. In other terms, the filtration unit 2 is positioned so that the gas, when infused into the secondary chamber 4, occupies a volume above of the sterile fluid because of the difference in terms of density between gas and sterile fluid, in particular wherein the gas has a density lower than the one of the sterile fluid, so that the gas is interposed between the sterile fluid and the outlet of the secondary chamber 4 of the filtration unit 2. The gas-fluid interface inside the secondary chamber 4 of the filtration unit is labeled as $GFI_F$ as shown in FIGS. 10, 11.

The step of allowing the gas to enter into the secondary chamber 4 of the filtration unit 2 may imply activation of at least one between the dialysis fluid pump 25 and the dialysate pump 26, wherein gas is allowed to enter in the fluid circuit 32 through a gas inlet arranged on the fluid circuit 32. This step implies to infuse gas inside the fluid circuit through a gas supply unit, i.e. a gas compressor, connected to said gas inlet at a pressure higher than a pressure present inside the fluid circuit: otherwise, the step may imply to activate at least one of the dialysis fluid pump 25 and the dialysate pump 26 to suck gas from the gas inlet arranged on the fluid circuit 32.

FIG. 10 shows the sterile infusion step according to the embodiment wherein the secondary chamber is filled with gas: sterile fluid is back filtered through the membrane 5 to enter into the blood circuit 17. In particular FIG. 10 shows an embodiment wherein the withdrawal clamp 20a, or the occlusive blood pump 21, prevents blood/fluid flow through the withdrawal line 6, so that the back filtered sterile fluid is forced to flow towards the blood return line 7, reaching and going beyond the gas inlet 49. The sterile fluid infusion step of the restitution procedure wherein the secondary chamber 4 is partially filled with gas may imply a complete blood restitution according to the embodiment of FIG. 11: sterile fluid is back filtered through the reduced surface of the membrane 5 of the filtration unit 2, so that the sterile fluid enters into the blood circuit 17 defining the first and the second fluid-blood interface FBI', FBI", and wherein the infusion step also determines moving of the blood towards the patient through the blood withdrawal line 6 and/or the blood return line 7. In particular the restitution procedure may imply simultaneous blood restitution through both the return and the withdrawal lines or a sequential blood restitution through the withdrawal line 6 and the return line 7, i.e. wherein blood is first returned to the patient through the withdrawal blood line 6 and then through the return blood line 7 or vice-versa.

The blood restitution procedure also comprises a step of causing a predetermined amount of gas to enter into the blood circuit 17 from the gas inlet 49 to define at least one gas-fluid interface GFI within the blood circuit 17: FIGS. 3 to 6 and 8 show gas introduction into the blood circuit according to different embodiments of the blood restitution procedure and at different times. In more detail, gas introduction into the blood circuit 17 defines a first gas-fluid interface GFI', interposed between the introduced gas and the second end of the blood return line 7, and a second gas-fluid interface GFI", interposed between the introduced gas and the second end of the blood withdrawal line 6. Gas introduction determines blood restitution to the patient through the blood return line 7 and/or blood withdrawal line 6 as the gas enters into the blood circuit. To be noted that the partial blood restitution due to the infusion of sterile fluid is in general lower, and in particular a way lower, in volume with respect to the blood restitution determined by the gas introduction.

The step of gas introduction also determines the split of the sterile fluid infused into the blood circuit 17 in a first sterile fluid portion and a second sterile fluid portion, wherein the first sterile fluid portion is interposed between the first fluid-blood interface FBI' and the first gas-fluid interface GFI', while the second sterile fluid portion is interposed between the second fluid-blood interface FBI" and the second gas-fluid interface GFI".

Figure 3:
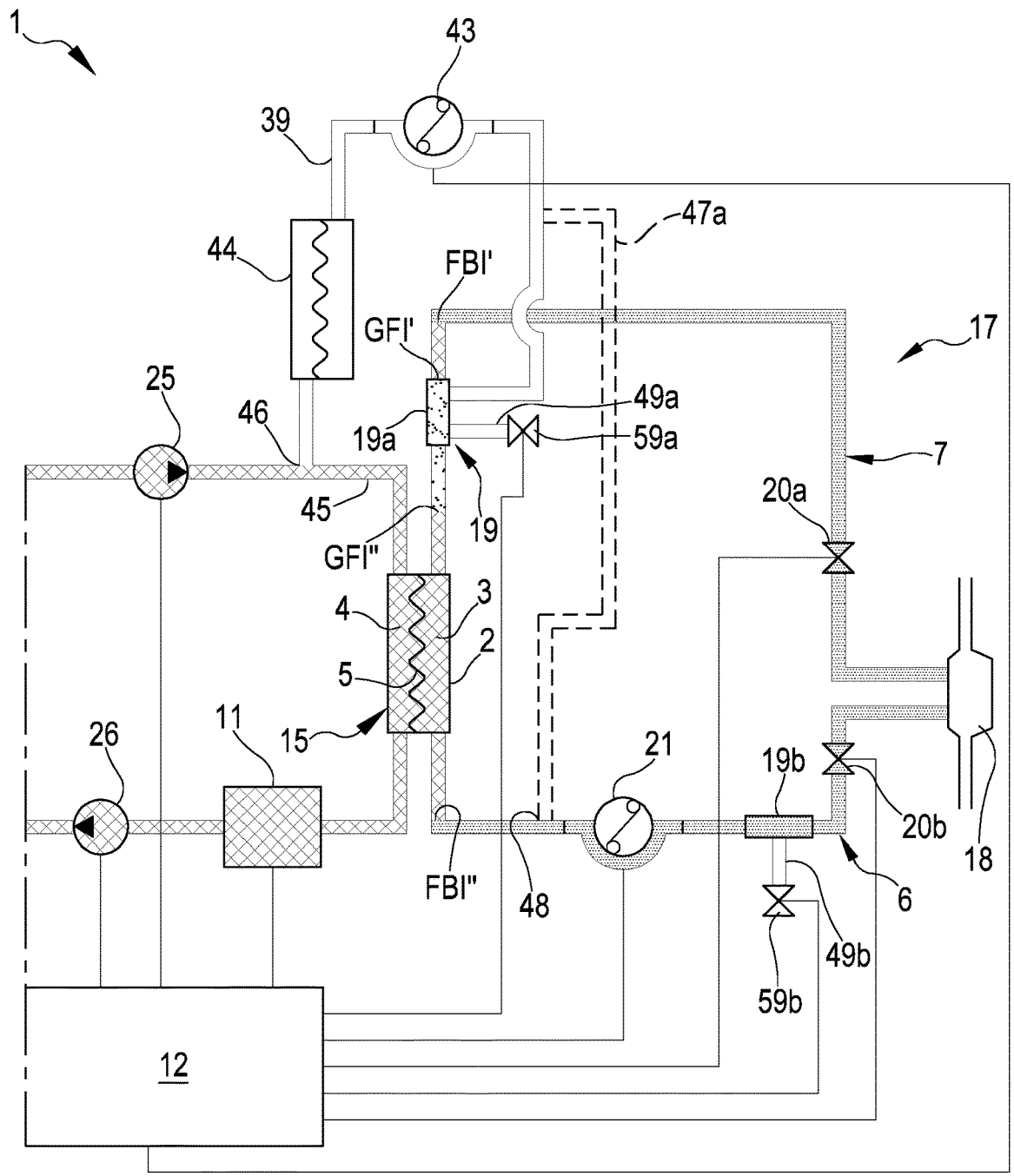
FIGS. 3, 4 and 5 are magnified schematic views of a blood treatment apparatus according to an embodiment of the present invention during sequential steps of gas infusion into the blood circuit.
Figure 4:
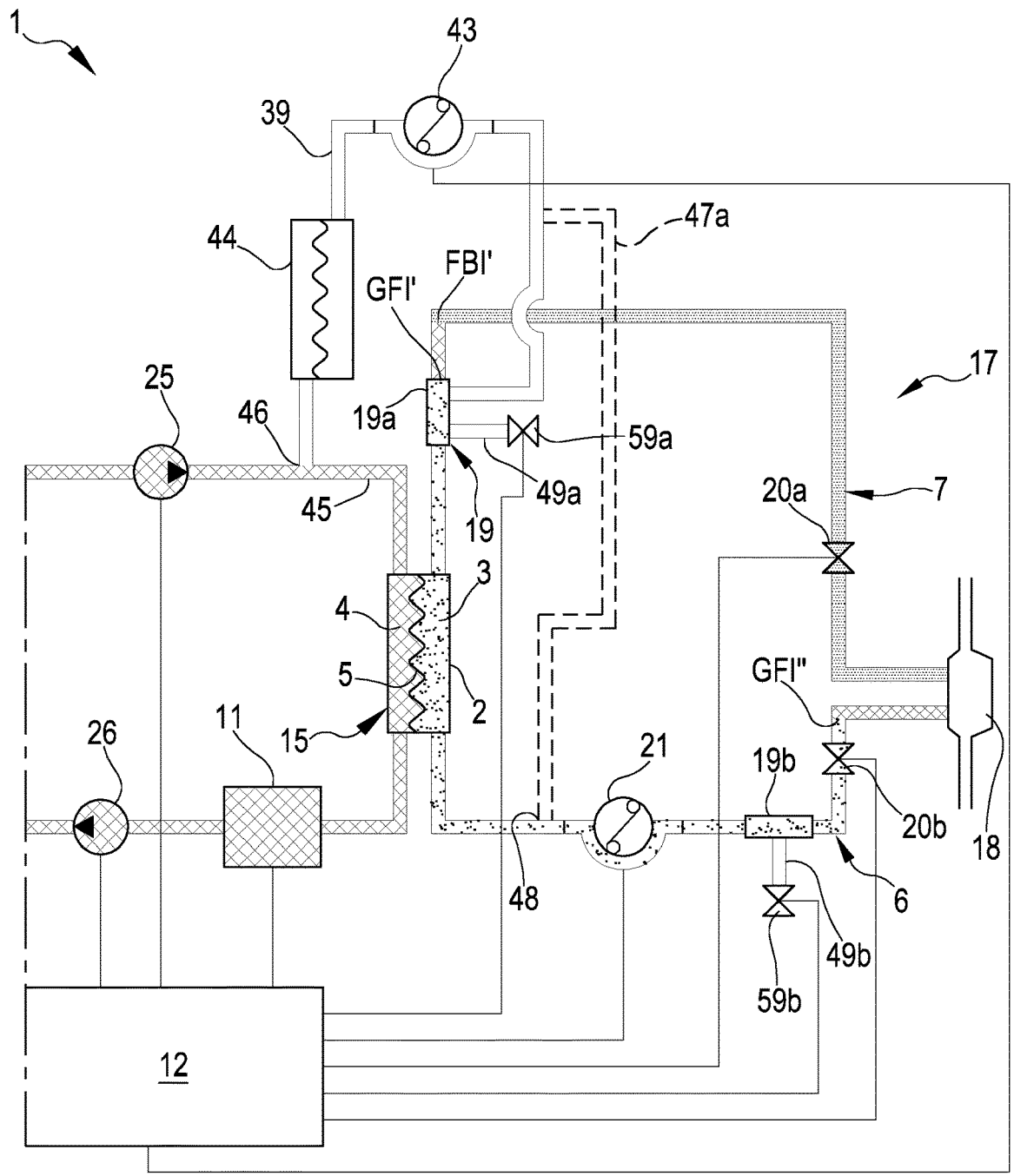

The restitution procedure implies to infuse the sterile fluid into the blood circuit 17 and to cause the gas to enter into the blood circuit 17 such that a distance between the fluid-blood interface FBI and the gas-fluid interface GFI is comprised between 0.5 cm and 10 cm, or between 1 cm and 5 cm: this distance is measured along the respective blood line. The amount of fluid which determines this distance between the FBI and the GFI depends upon the geometrical characteristics of the blood lines: therefore, as a function of the geometrical characteristics of the blood lines, an amount of fluid to be infused has to be computed by, i.e. the control unit 12. The restitution procedure implies, during the step of gas introduction, to command the intercepting element 59 of the gas inlet 49, which has been reached by the infused sterile fluid, in the open position, so as to allow gas to enter into the blood circuit. According to an embodiment shown in FIGS. 3 and 4, the step of gas introduction is determined by activating the blood pump 21 towards the second end of the blood withdrawal line 6, so that gas is sucked from the first gas inlet 49*a* into the blood circuit 17, being the first intercepting element 59*a* commanded in the open position: as the blood pump 21 determines fluid flow towards the patient, a partial blood restitution is performed, in particular wherein the residual blood of the withdrawal line 6 is returned to the patient. At the same time, the second fluid-blood interface FBI" and the second gas-fluid interface GFI" move towards the second end of the withdrawal line 6, pushing the residual blood into the vascular system of the patient, while the first fluid-blood interface FBI' and the first gas-fluid interface GFI' substantially keep their position within the blood circuit 17. During this gas introduction step, the blood return safety clamp 20*a* is commanded in the closed position, while the blood withdrawal safety clamp 20*b* is commanded in the open position. FIG. 3 shows a starting phase of the gas introduction from the first gas inlet 49*a*, wherein the GFI" travels within the blood withdrawal line 6 towards and beyond the blood pump 21, until residual blood in the withdrawal line 6 is substantially, in particular completely, returned to the patient, as shown in FIG. 4.

Figure 5:
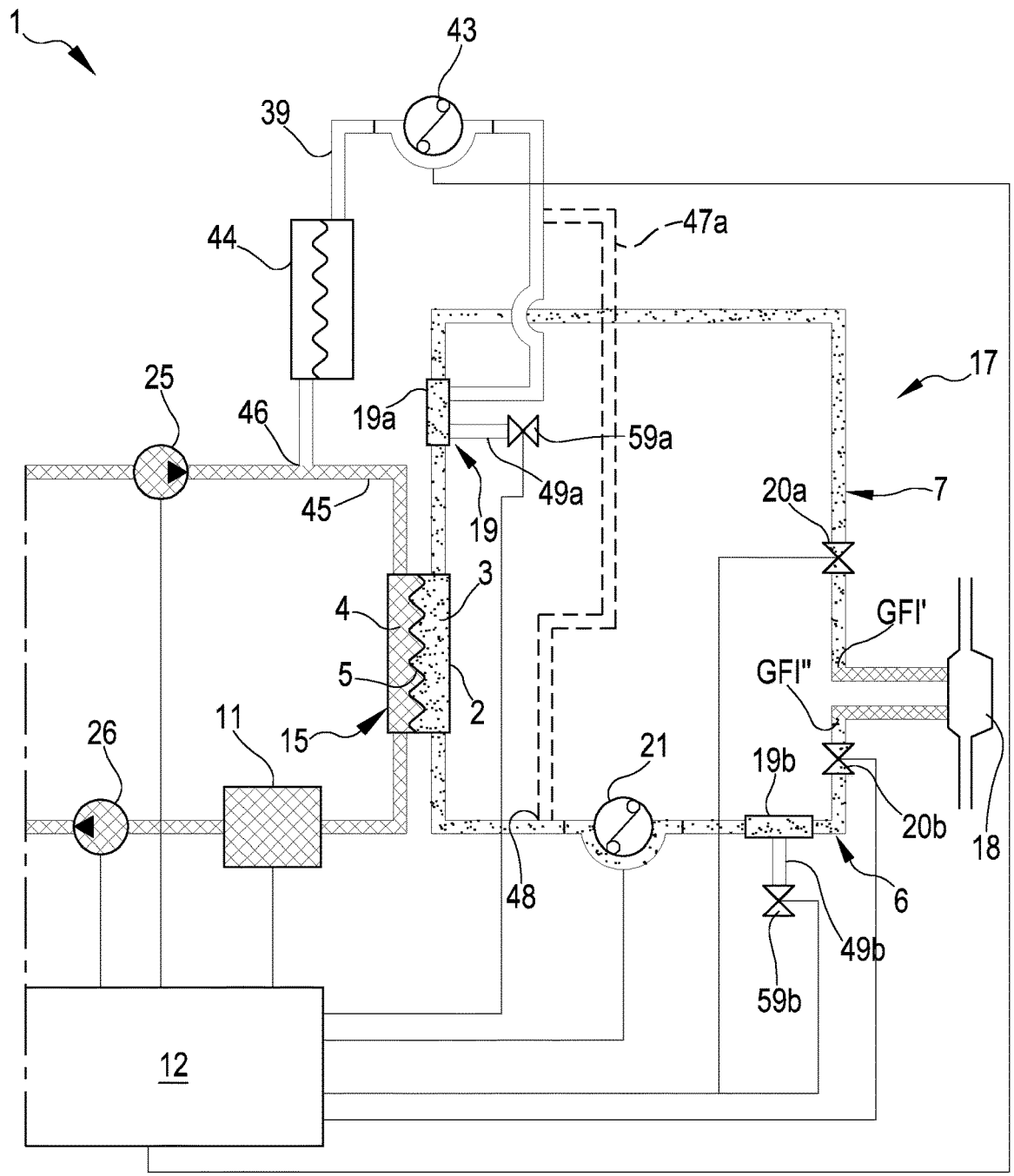

Subsequently, according to the same embodiment shown in FIGS. 3 and 4, the gas introduction step implies closing the first intercepting element 59*a* of the first gas inlet 49*a*, closing the blood withdrawal safety clamp 20*b*, opening the second intercepting element 59*b* of the second gas inlet 49*b*, opening the return blood safety clamp 20*a*, and activating the blood pump 21 in a direction towards the second end of the blood return line 7, so that gas is sucked from the second gas inlet 49*b* and the first fluid-blood interface FBI' and the first gas-fluid interface GFI' are moved towards the second end of the blood return line 7, as shown in FIG. 5. Movement of the first fluid-blood interface FBI' and of the first gas-fluid interface GFI' allows the residual blood in the return line 7 to be returned to the patient through the blood return line 7. In other terms, the blood restitution procedure implies moving simultaneously, towards the patient P and before patient disconnection, at least part of the extracorporeal blood remained in the blood circuit 17, at least part of the sterile fluid interposed between the first fluid-blood interface FBI and the first gas-fluid interface GFI, and at least part of the gas. In other terms, advancing movement of the fluid-blood interface FBI and of the gas-fluid interface GFI towards the patient allows both blood restitution and emptying of the blood lines 6, 7.

According to a further embodiment shown in FIG. 6, the apparatus comprises the gas supply unit 60 fluidly connected to the gas inlet 49 of the blood circuit: the gas introduction step comprises to activate the gas supply unit 60 to infuse pressurized gas into the blood circuit. By commanding the safety clamps 20*a* or 20*b*, or the blood pump 21 in case it is an occlusive blood pump, gas is allowed to transit within the blood circuit towards the second end of the blood return line 7 or towards the second end of the blood withdrawal line 6. For example, the blood restitution procedure may imply to close the blood withdrawal safety clamp 20*b* so that the first fluid-blood interface FBI' and the first gas-fluid interface GFI' move towards the second end of the blood return line 7. Otherwise, the blood restitution procedure may alternatively imply to close the blood return safety clamp 20*a* so that the second fluid-blood interface FBI" and the second gas-fluid interface GFI" move towards the second end of the blood withdrawal line 6. Moreover, the blood restitution procedure may also imply to open both the blood return safety clamp 20*a* and blood withdrawal safety clamp 20*b* so that the first fluid-blood interface FBI' and the first gas-fluid interface GFI' move towards the second end of the blood return line 7 and, simultaneously, the second fluid-blood interface FBI" and the second gas-fluid interface GFI" move towards the second end of the blood withdrawal line 6. In other terms, blood restitution may occur simultaneously through both the return and withdrawal blood lines or selectively through one between the return and the withdrawal blood lines. According to the embodiment of FIG. 6, the apparatus comprises one first gas inlet 49*a* on the blood return line 7 and one gas supply unit 60 arranged at this gas inlet 49*a*: anyhow, an apparatus may be provided with the gas inlet and the gas supply unit arranged on the blood withdrawal line 6. Moreover it has to be noted that the blood restitution procedure may be completed having a single gas inlet 49, arranged on the return or on the withdrawal line 7, 6.

According to any of the previous described embodiments, the blood restitution procedure ends when the sterile fluid, in particular the first and the second portions of the sterile fluid, reach the vascular access 18 of the patient: a small amount of sterile fluid might be also infused into the patient in order to complete blood restitution and improve cleaning and emptying of the blood lines. According to an embodiment, the restitution procedure is stopped when the fluid-blood interface FBI approaches at least one between the second end of the blood withdrawal line 6 and the second end of the blood return line 7, or when a preset amount of sterile fluid has been infused into the patient. In particular, the restitution procedure may be stopped when the gas-fluid interface GFI reaches a preset distance from the second end of the blood withdrawal line 6 and/or the second end of the blood return line 7: the preset distance, which is measured along the respective blood line, may be set as lower than 10 cm or 5 cm.

The blood circuit 17 may also comprise a gas sensor arranged close to the second end of the blood withdrawal line 6 and/or to the second end of the blood return line 7: the gas sensor is configured to provide a signal representative of the presence of gas in the respective blood line, so that the control unit 12 is configured or the method comprises to receive this signal and to stop advancement of the gas-fluid interface GFI. In particular the control unit is configured to stop the blood pump 21 or the gas supply unit 60, move the blood withdrawal intercepting element 20*b* in the closed position if the gas sensor of the blood withdrawal line 6 detects presence of gas, and/or move the blood return intercepting mean 20*a* in the closed position if the gas sensor of the blood return line 7 detects presence of gas.

According to a further embodiment, the blood restitution procedure ends when a predetermined amount of gas has been introduced within the blood circuit: this predetermined amount may be computed as a function of the inner volume of the blood circuit 17, so that the amount of gas is lower in volume than said inner volume of the blood circuit 17.

FIGS. 7 and 8 show an embodiment of the apparatus wherein a single gas inlet 49 is provided on the blood return line 7: in particular, this gas inlet 49 may be arranged as close as possible to the vascular access 18 of the patient. The blood restitution procedure comprises, according to this embodiment, the previously described step of infusing through the infusion line 39 a predetermined amount of sterile fluid into the blood circuit 17 up to and beyond the gas inlet 49: back filtration infusion may also be performed to infuse the predetermined amount of sterile fluid into the blood circuit 17 up to and beyond the gas inlet 49. FIG. 7 shows a phase wherein the sterile fluid infusion step has caused a partial blood restitution to the patient through the blood return line 7: indeed, the blood previously remained in the return blood line 7 between the gas inlet 49 and the vascular access has been replaced by the sterile fluid, while residual blood is still present in the rest of the blood return line 7 up to the filtration unit 2 and within the whole blood withdrawal line 6. According to a non-limitative configuration, during the fluid infusion step the blood return safety clamp 20a and the blood withdrawal safety clamp 20b are moved, simultaneously or sequentially, in the open position, so that sterile fluid is allow to pass beyond the gas inlet 49 and enter into an upstream portion and a downstream portion of the blood return line. In case the blood pump 21 is an occlusive pump, the infusion step implies activating the blood pump 21 towards the second end of the withdrawal line 6 in order to allow the sterile fluid to flow into an upstream portion of the blood return line 7 with respect to the gas inlet 49.

The blood restitution procedure further comprises (see FIG. 8) a step to command opening of the intercepting element 59 of the gas inlet 49, closing the blood return safety clamp 20a, opening the blood withdrawal safety clamp 20b, and activating the blood pump 21 towards the second end of the withdrawal line 6, so that gas is sucked from the gas inlet 49 of the blood return line 7 as shown in FIG. 8. During this step, the second fluid-blood interface FBI" and the second gas-fluid interface GFI" move towards the second end of the withdrawal line 6, pushing the residual blood back to the patient through the withdrawal line 6.

According to an embodiment of the restitution procedure, the predetermined amount of sterile fluid infused into the blood circuit 17 is lower in volume than the predetermined amount of gas introduced: indeed, the amount of sterile fluid infused has to be sufficient only for defining the fluid-blood interface FBI and the gas-fluid interface GFI, so that a gas-blood interface is prevented since it would otherwise cause local blood coagulation. More in detail, the predetermined amount of sterile fluid infused may be comprised between the 5% and the 80% in volume of the predetermined amount of gas, in particular between the 10% and the 60%. In addition, the predetermined amount in volume of sterile fluid may be comprised between 1% and 60% of the blood circuit inner volume, more in detail between 2% and 40% or between 5% and 30%. Anyhow, the predetermined amount of gas is lower in volume than the blood circuit inner volume: the predetermined amount of gas introduced into the blood circuit 17 is commonly comprised between 50 ml and 150 ml, said values being measured at 25° and at atmospheric pressure. A total infused fluid volume is defined by the sum of the predetermined amount of sterile fluid and the predetermined amount of gas introduced into the blood circuit 17: this total infused fluid volume is comprised between the 60% and the 160% of the blood circuit inner volume.

Here after different configurations of the blood restitution procedure are provided: each configuration has been described in detail to provide a representation of the procedure as clear as possible. Therefore, the restitution procedures provided here after are to be intended as non-limitative for the scope of the invention while as an exemplificative representation of a blood restitution procedure.

A restitution procedure, according to a first configuration shown in figures from 2, 2a, 3, 4 and 5, implies to sequentially perform the following steps:
  commanding at least one between the return blood safety clamp 20a and the withdrawal blood safety clamp 20b in the open position, or commanding the return blood safety clamp 20a in the open position and the withdrawal blood safety clamp 20b in the closed position or commanding the return blood safety clamp 20a in the closed position and the withdrawal blood safety clamp 20b in the open position;
  commanding infusion of the predetermined amount of sterile fluid into the blood circuit 17 by:
    activating the dialysis fluid pump 25 and optionally the arrest or activation at low speed of the dialysate pump 26 to determine back-filtering the dialysis fluid through the semi-permeable membrane 5 (FIG. 2); and/or
    activating the infusion pump 43 to determine fluid infusion through the infusion line 39 (FIG. 2a),
  wherein this step determines the sterile fluid to pass beyond the location of the first gas inlet 49a, and wherein this step defines the first and the second fluid-blood interface FBI', FBI";
  commanding the first intercepting element 59a of the first gas inlet 49a on the blood return line 7 in the open position, the second intercepting element 59b of the second gas inlet 49b on the blood withdrawal line 6 in the closed position, the blood return safety clamp 20a in the closed position, and the blood withdrawal safety clamp 20b in the open position;
  commanding activation of the blood pump 21 in a direction towards the second end of the blood withdrawal line 6 to cause sucking of the predetermined amount of gas into the blood circuit 17 from the first gas inlet 49a (FIGS. 3 and 4), this step defining the first and the second gas-fluid interfaces GFI', GFI" and determining the second gas-fluid interface GFI" and the second fluid-blood interface FBI" to move towards the second end of the blood withdrawal line 6 causing a partial blood restitution to the patient P through the blood withdrawal line 6;
  commanding the blood withdrawal safety clamp 20b in the closed position, the blood return safety clamp 20a in the open position, the first intercepting element 59a of the first gas inlet 49a on the blood return line 7 in the closed position and the second intercepting element 59b of the second gas inlet 49b on the blood withdrawal line 6 in the open position;
  command activation of the blood pump 21 in a direction towards the second end of the blood return line 7, this step determining the first gas-fluid interface GFI' and the first fluid-blood interface FBI' to move towards the second end of the blood return line 7 causing restitution to the patient P of an amount of blood through the blood return line 7.

The restitution procedure, according to a second configuration shown in FIGS. 7 and 8, implies to sequentially perform the following steps:
  commanding at least one between the return blood safety clamp 20a and the withdrawal blood safety clamp 20b in the open position, or commanding the return blood safety clamp 20a in the open position and the withdrawal blood safety clamp 20b in the closed position or commanding the return blood safety clamp 20a in the closed position and the withdrawal blood safety clamp 20b in the open position;
  commanding infusion (FIG. 7) of the predetermined amount of sterile fluid into the blood circuit 17 by:
    activating the dialysis fluid pump 25 and optionally the arrest or activation at low speed of the dialysate pump 26 to determine back-filtering the dialysis fluid through the semi-permeable membrane 5 (FIG. 2); and/or activating the infusion pump 43 to determine fluid infusion through the infusion line 39 (FIG. 2a), wherein this step determines the sterile fluid to pass beyond the location of the first gas inlet 49a, and wherein this step defines the first and the second fluid-blood interface FBI', FBI";

determining a partial blood restitution (FIG. 7) through the blood return line 7 due to the sterile fluid infusion, the blood return safety clamp 20a being arranged in the open position;

commanding the intercepting element 59 of the gas inlet 49 in the open position, the blood return safety clamp 20a in the closed position, and the blood withdrawal safety clamp 20b in the open position;

commanding activation of the blood pump 21 in a direction towards the second end of the blood withdrawal line 6 to cause sucking of the predetermined amount of gas into the blood circuit 17 from the gas inlet 49 (FIG. 8), the latter being arranged on the blood return line 7 as close as possible to the patient, wherein this step defining the first gas-fluid interface GFI' and the second gas-fluid interface GFI" and determining the second gas-fluid interface GFI" and the second fluid-blood interface FBI", to move towards the second end of the blood withdrawal line 6 causing blood restitution to the patient P through the blood withdrawal line 6.

The restitution procedure, according to a third configuration, implies the apparatus, as shown in FIG. 6, to comprise the gas supply unit 60 connected to one gas inlet 49, in particular to the first gas inlet 49a or to the second gas inlet 49b: the procedure implies to sequentially perform the following steps:

commanding at least one between the return blood safety clamp 20a and the withdrawal blood safety clamp 20b in the open position, or commanding the return blood safety clamp 20a in the open position and the withdrawal blood safety clamp 20b in the closed position or commanding the return blood safety clamp 20a in the closed position and the withdrawal blood safety clamp 20b in the open position;

commanding infusion of the predetermined amount of sterile fluid into the blood circuit 17 by:
activating the dialysis fluid pump 25 and optionally the arrest or activation at low speed of the dialysate pump 26 to determine back-filtering the dialysis fluid through the semi-permeable membrane 5; and/or
activating the infusion pump 43 to determine fluid infusion through the infusion line 39, wherein this step determines the sterile fluid to pass beyond the location of the first gas inlet 49a, and wherein this step defines the first and the second fluid-blood interface FBI', FBI";

commanding the intercepting element 59 of the gas inlet 49 in the open position;

commanding at least one between the return blood safety clamp 20a and the withdrawal blood safety clamp 20b in the open position;

command activation of the gas supply unit 60 to infuse gas into the blood circuit 17, this step determining:
the second gas-fluid interface GFI" and the second fluid-blood interface FBI" to move towards the second end of the blood withdrawal line 6 causing restitution to the patient P of an amount of blood through the blood withdrawal line 6; and/or
the first gas-fluid interface GFI' and the first fluid-blood interface FBI' to move towards the second end of the blood return line 7 causing restitution to the patient P of an amount of blood through the blood return line 7.

The restitution procedure, according to a fourth configuration not shown in the attached figures, implies to sequentially perform the following steps:

commanding infusion of the predetermined amount of sterile fluid into the blood circuit (17) through the infusion line (39) or by back-filtering the dialysis fluid through the semi-permeable membrane (5), said step determining the sterile fluid to pass beyond the location of the gas inlet (49), said gas inlet (49) being arranged on the blood withdrawal line (6), said step defining the first and the second fluid-blood interface (FBI', FBI");

determining a partial blood restitution through the blood withdrawal line (6) due to the sterile fluid infusion, the blood withdrawal safety clamp (20b) being in the open position;

commanding the intercepting element (59) of the gas inlet (49) in the open position, the blood withdrawal safety clamp (20b) in the closed position, and the blood return safety clamp (20a) in the open position;

commanding activation of the blood pump (21) in a direction towards the second end of the blood return line (7) to cause sucking of the predetermined amount of gas into the blood circuit (17) from the gas inlet (49), this step determining the at least one gas-fluid interface (GFI), in particular the first gas-fluid interface (GFI') and the first fluid-blood interface (FBI'), to move towards the second end of the blood return line (7) causing blood restitution to the patient (P) through the blood return line (7). The blood restitution procedure may further comprise a push-pull procedure configured to empty an end portion of the second end of the blood return line 7 or of the blood withdrawal line 6 which may be still filled with sterile fluid or with residual blood or with a mixture of fluid and blood. In particular the push-pull procedure may be performed at the end of the second and/or the fourth configuration of the blood restitution procedures in apparatuses having a single gas inlet 49. In more detail, the push-pull procedure implies to periodically activate the blood pump 21 in both directions, in particular towards the second end of the withdrawal line 6 and towards the second end of the return line 7, and periodically open and close the gas inlet 49 to promote moving of the residual fluid included in the blood circuit towards the patient.

In more detail, the second configuration of the blood restitution procedure may further comprise, at the end, the push-pull procedure which comprises the steps of:

activating the blood pump 21 towards the second end of the blood withdrawal line 6, the blood withdrawal safety clamp 20b and the blood return safety clamp 20a being arranged in a closed position, the intercepting element 59 of the gas inlet 49 of the blood return line 7 being arranged in an open position, in particular said step determining gas sucking from said gas inlet 49 into the blood circuit 17 and optionally compression of the gas included between the blood pump 21 and the blood withdrawal safety clamp 20b;

activating the blood pump 21 towards the second end of the blood return line 7, the blood withdrawal safety clamp 20b being arranged in closed position, the blood return safety clamp 20a being arranged in a open position, the intercepting element 59 of the gas inlet 49 of the blood return line 7 being arranged in a closed position, in particular said step determining moving of the residual fluid towards the patient through the blood return line 7, more in particular said step determining moving of the first gas-fluid interface GFI' towards the second end of the blood return line 7.

The push pull procedure may be repeated in loop to move the gas-fluid interface GFI' towards the second end of the return line 7, in order to fill the latter with gas.

Analogously, the fourth configuration of the blood restitution procedure may further comprise, at the end, the push-pull procedure which comprises the steps of:
- activating the blood pump 21 towards the second end of the blood return line 7, the blood withdrawal safety clamp 20b and the blood return safety clamp 20a being arranged in a closed position, the intercepting element 59 of the gas inlet 49 of the blood withdrawal line 6 being arranged in an open position, in particular said step determining gas sucking from said gas inlet 49 into the blood circuit 17 and optionally compression of the gas included between the blood pump 21 and the blood return safety clamp 20a;
- activating the blood pump 21 towards the second end of the blood withdrawal line 6, the blood withdrawal safety clamp 20b being arranged in open position, the blood return safety clamp 20a being arranged in a closed position, the intercepting element 59 of the gas inlet 49 of the blood withdrawal line 6 being arranged in a closed position, in particular said step determining moving of the residual fluid towards the patient through the blood withdrawal line 6, more in particular said step determining moving of the second gas-fluid interface GFI" towards the second end of the blood withdrawal line 6. The push pull procedure may be repeated in loop to move the gas-fluid interface GFI" towards the second end of the withdrawal line 6, in order to fill the latter with gas.

To be noted that the apparatuses configured to perform a restitution procedure according to the second and/or fourth configurations may comprise a single gas inlet, in particular respectively arranged on the blood return line 7 or on the blood withdrawal line 6.

The restitution procedure, according to a fifth configuration shown in FIG. 10, implies to sequentially perform the following steps:
- allowing a predetermined amount of gas to enter into the secondary chamber 4 of the filtration unit 2;
- commanding at least one between the return blood safety clamp 20a and the withdrawal blood safety clamp 20b in the open position, or commanding the return blood safety clamp 20a in the open position and the withdrawal blood safety clamp 20b in the closed position or commanding the return blood safety clamp 20a in the closed position and the withdrawal blood safety clamp 20b in the open position;
- commanding infusion (FIG. 10) of the predetermined amount of sterile fluid into the blood circuit 17 by activating the dialysis fluid pump 25 and optionally the arrest or activation at low speed of the dialysate pump 26 to determine back-filtering of the dialysis fluid through a partial portion of the semi-permeable membrane 5;

wherein this fluid infusion step determines the sterile fluid to pass beyond the location of the gas inlet 49, in particular of the first or second gas inlet 49a, 49b, and wherein this step defines the first and the second fluid-blood interface FBI', FBI",
and wherein this fluid infusion step implies that the secondary chamber 4 of the filtration unit is filled both with gas and sterile fluid, in particular filled with an amount of gas higher in volume with respect to the amount of fluid (see FIG. 10 or 11);
- determining a partial blood restitution (FIG. 7) through the blood return line 7 due to the sterile fluid infusion, the blood return safety clamp 20a being arranged in the open position;
- commanding the intercepting element 59 of the gas inlet 49 in the open position, the blood return safety clamp 20a in the closed position, and the blood withdrawal safety clamp 20b in the open position;
- commanding activation of the blood pump 21 in a direction towards the second end of the blood withdrawal line 6 to cause sucking of the predetermined amount of gas into the blood circuit 17 from the gas inlet 49 (FIG. 8), the latter being arranged on the blood return line 7 as close as possible to the patient, wherein this step defining the first gas-fluid interface GFI' and the second gas-fluid interface GFI" and determining the second gas-fluid interface GFI" and the second fluid-blood interface FBI", to move towards the second end of the blood withdrawal line 6 causing blood restitution to the patient P through the blood withdrawal line 6.

Figure 12:
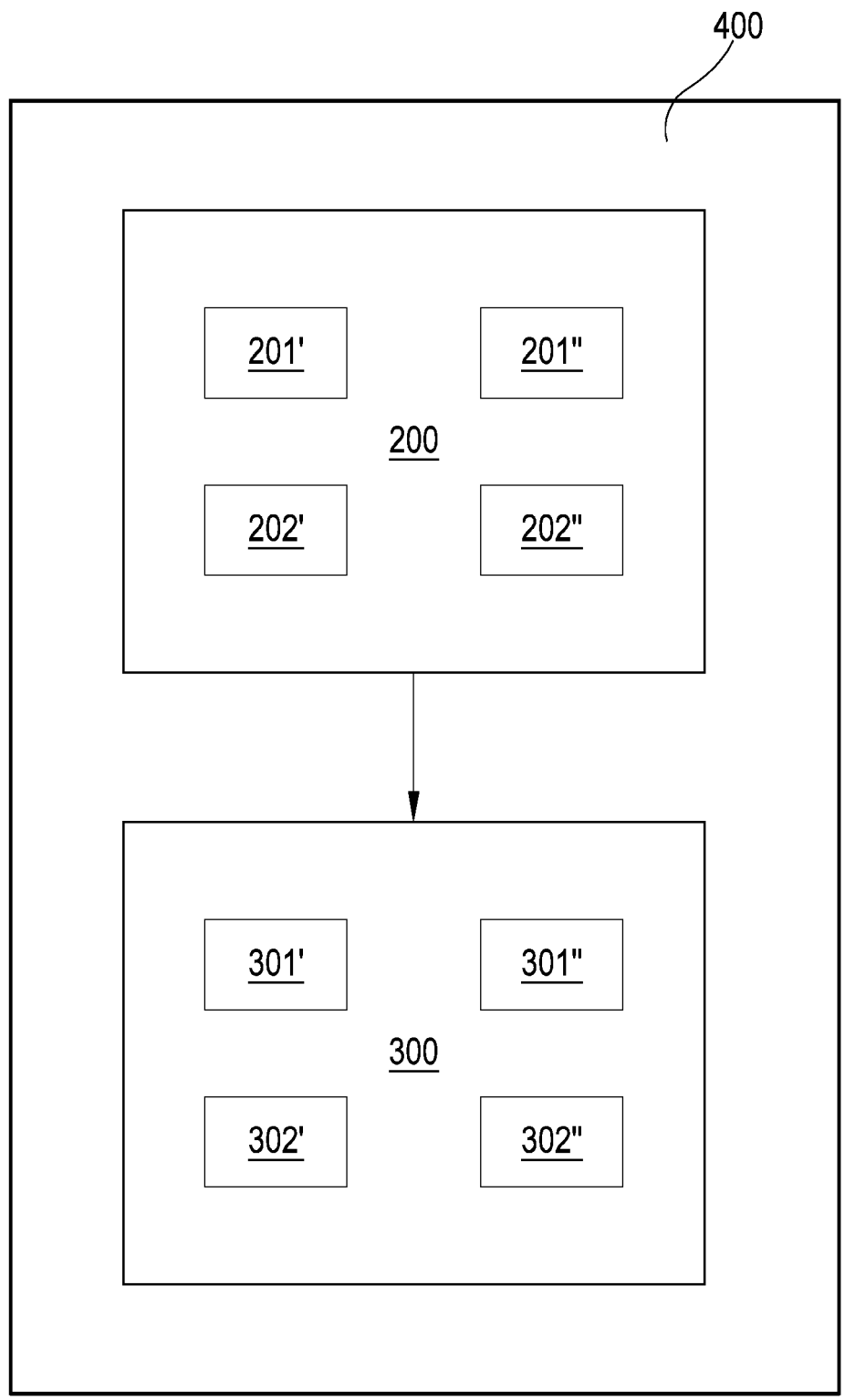
FIGS. 12 and 13 are flow charts comprising the main steps to perform the blood restitution procedure according to different embodiments.

FIG. 12 shows a flow chart representing the main steps of a blood restitution procedure 400, comprising the step 200 of infusing a predetermined amount of sterile fluid from the supply source 50 into the blood circuit 17, and the subsequent step 300 of causing a predetermined amount of gas to enter into the blood circuit 17 from a gas inlet 49. The step 200 determines the sub step 201' of defining the first fluid-blood interface FBI' and the sub step 201" of defining the second fluid-blood interface FBI". Moreover, the step 200 determines the sub step 202' of moving the first fluid-blood interface FBI' towards a venous access of the patient causing a partial blood restitution, and the sub step 202" of moving the second fluid-blood interface FBI" towards an arterial access of the patient causing a further partial blood restitution. The step 300 determines the sub step 301' of defining the first gas-fluid interface GFI' and the sub step 301" of defining the second gas-fluid interface GFI". Moreover, the step 300 determines the sub step 302' of moving the first fluid-blood interface FBI' and the first gas-fluid interface GFI' towards a venous access of the patient causing blood restitution, and the sub step 302" of moving the second fluid-blood interface FBI" and the second gas-fluid interface GFI" towards an arterial access of the patient completing the blood restitution.

Figure 13:
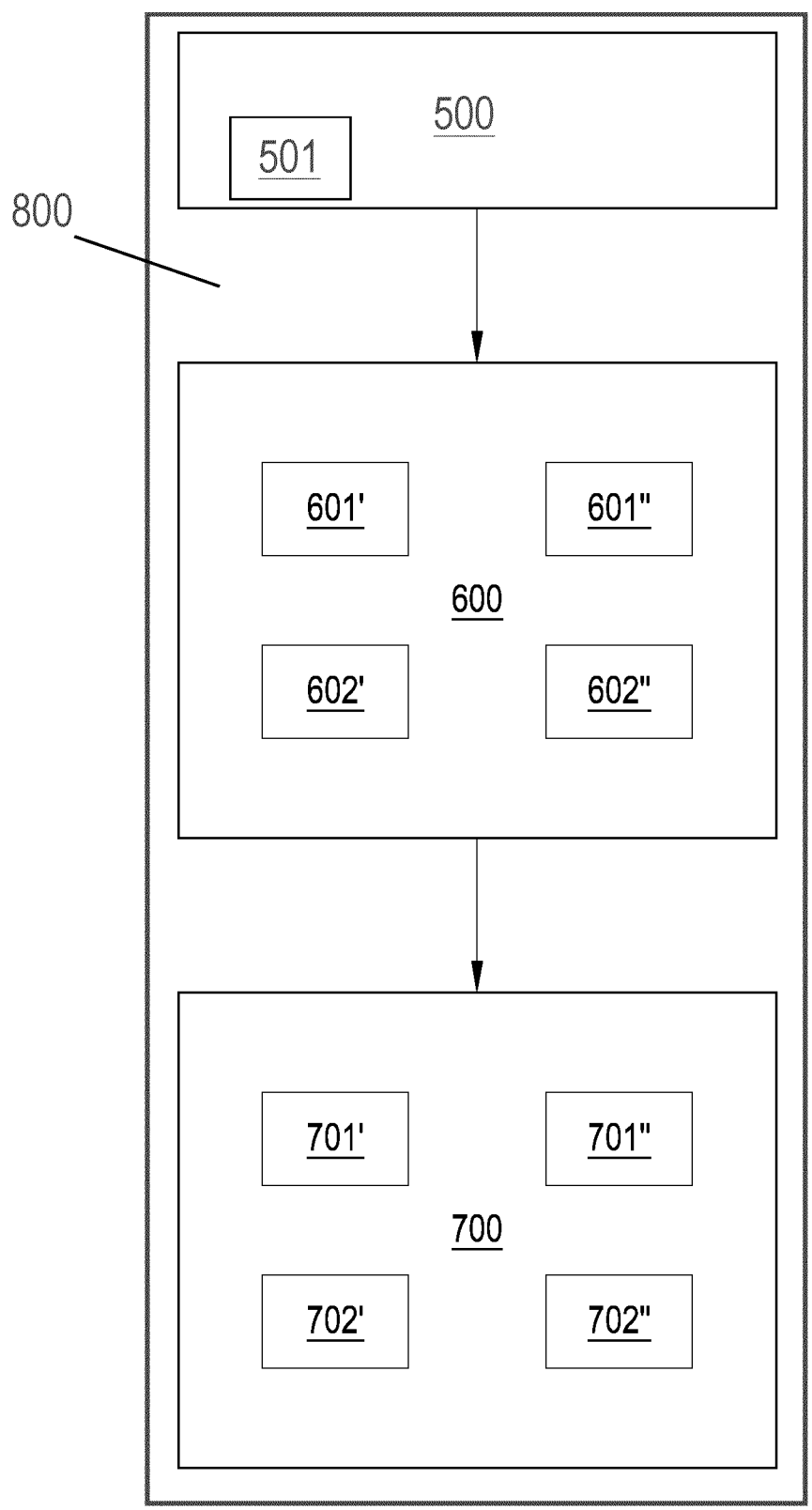

FIG. 13 shows a flow chart representing the main steps of a blood restitution procedure 800, comprising the step 500 of allowing an amount of gas to enter into the secondary chamber 4 of the filtration unit 2, and the step 600 of infusing a predetermined amount of sterile fluid from the supply source 50 into the blood circuit 17. Optionally, the restitution procedure 800 also comprises a subsequent step 700 of causing a predetermined amount of gas to enter into the blood circuit 17 from a gas inlet 49. The step 500 determined the step 501 of defining the gas-fluid interface into the secondary chamber of the filtration unit 2, said interface been labeled as $GFI_F$ in FIGS. 10, 11. The step 600 determines the sub step 601' of defining the first fluid-blood interface FBI' and the sub step 601" of defining the second fluid-blood interface FBI" inside the blood circuit 17. Moreover, the step 600 determines the sub step 602' of moving the first fluid-blood interface FBI' towards a venous access of the patient causing a partial blood restitution, and the sub step 602" of moving the second fluid-blood interface FBI" towards an arterial access of the patient causing a further partial blood restitution. The optional step 700 determines the sub step 701' of defining the first gas-fluid interface GFI' and the sub step 701" of defining the second gas-fluid interface GFI". Moreover, the step 700 determines the sub step 702' of moving the first fluid-blood interface FBI' and the first gas-fluid interface GFI' towards a venous access of the patient causing blood restitution, and the sub step 702" of moving the second fluid-blood interface FBI" and the second gas-fluid interface GFI" towards an arterial access of the patient completing the blood restitution.

While the invention has been described in connection with what is presently considered to be the most common embodiments, it is to be understood that the invention is not to be limited to the disclosed embodiments, but on the contrary, is intended to cover various modifications and equivalent arrangements included within the scope of the appended claims.

The invention claimed is:

1. An apparatus for extracorporeal blood treatment comprising:
   a filtration unit having a primary chamber and a secondary chamber separated by a semi-permeable membrane;
   a blood circuit including:
      a blood withdrawal line extending between a first end connected to an inlet of the primary chamber and a second end for connection to a patient, and
      a blood return line extending between a first end connected to an outlet of the primary chamber and a second end for connection to the patient;
   a blood pump operable with the blood circuit;
   a fluid circuit including:
      a dialysis fluid effluent line connected to an outlet of the secondary chamber, and
      a fluid supply source for providing a sterile fluid;
   at least one gas inlet to allow gas to enter into the blood circuit; and
   a control unit configured to perform a blood restitution procedure towards the patient for ending an extracorporeal blood treatment and before disconnecting the patient, the blood restitution procedure comprising:
      infusing a predetermined amount of the sterile fluid from the fluid supply source into the blood circuit, the sterile fluid infusion defining at least one fluid-blood interface into the blood circuit,
      causing a predetermined amount of gas to enter into the blood circuit from the at least one gas inlet to define at least one gas-fluid interface into the blood circuit, wherein at least part of the sterile fluid is interposed between the at least one fluid-blood interface and the at least one gas-fluid interface, and
      moving simultaneously
         (i) at least part of the extracorporeal blood contained in the blood circuit,
         (ii) the at least part of the sterile fluid interposed between the at least one fluid-blood interface and the at least one gas-fluid interface, and
         (iii) at least part of the gas
      towards the patient to restitute part of the blood to the patient before patient disconnection,
   wherein the at least one fluid-blood interface comprises a first fluid-blood interface and a second fluid-blood interface into the blood circuit, wherein the first fluid-blood interface is interposed between the sterile fluid and the second end of the blood return line and the second fluid-blood interface is interposed between the sterile fluid and the second end of the blood withdrawal line,
   wherein the at least one gas-fluid interface comprises a first gas-fluid interface and a second gas-fluid interface into the blood circuit, wherein, at least after the gas has entered the blood circuit, at least part of the sterile fluid is interposed between the first fluid-blood interface and the first gas-fluid interface and at least part of the sterile fluid is interposed between the second fluid-blood interface and the second gas-fluid interface,
   wherein causing the gas to enter into the blood circuit determines a split of the sterile fluid infused into the blood circuit in a first sterile fluid portion and a second sterile fluid portion, the first sterile fluid portion being interposed between the first fluid-blood interface and the first gas-fluid interface, and the second sterile fluid portion being interposed between the second fluid-blood interface and the second gas-fluid interface,
   wherein the blood restitution procedure comprises moving the first sterile fluid portion towards the second end of the blood return line and, simultaneously or sequentially, moving the second sterile fluid portion towards the second end of the blood withdrawal line, and
   wherein the blood restitution procedure comprises moving the first fluid-blood interface and the first gas-fluid interface towards the second end of the blood return line and moving the second fluid-blood interface and the second gas-fluid interface towards the second end of the blood withdrawal line.

2. The apparatus of claim 1, wherein the fluid circuit further comprises a dialysis fluid supply line connected to an inlet of the secondary chamber, the fluid supply source being a dialysis fluid supply source and providing a dialysis fluid at least to the dialysis fluid supply line,
   wherein the sterile fluid infusion from the dialysis fluid supply source into the blood circuit comprises back-filtering the dialysis fluid through the semi-permeable membrane into the blood circuit in an amount of dialysis fluid to at least reach a location of the at least one gas inlet.

3. The apparatus of claim 1, wherein the fluid circuit further comprises an infusion line fluidly connected to the blood circuit, and wherein the infusion line is configured to infuse the sterile fluid into the blood circuit at an infusion point interposed between the first end and the second end of the blood withdrawal line or of the blood return line.

4. The apparatus of claim 3, wherein the fluid supply source is a dialysis fluid supply source connected to the infusion line for providing the dialysis fluid to at least the infusion line, and wherein the sterile fluid infusion from the dialysis fluid supply source into the blood circuit comprises infusing the sterile fluid through the infusion line directly into the blood circuit in an amount of sterile fluid to at least reach a location of the at least one gas inlet.

5. The apparatus of claim 3, wherein the fluid supply source is a replacement fluid supply source, in the form of a bag, providing the fluid to at least the infusion line, and wherein the sterile fluid infusion into the blood circuit comprises infusing the sterile fluid through the infusion line directly into the blood circuit in an amount of sterile fluid to at least reach a location of the at least one gas inlet.

6. The apparatus of claim 1, comprising a return blood safety clamp arranged on the blood return line and a withdrawal blood safety clamp arranged on the blood withdrawal line, the return blood safety clamp and the withdrawal blood safety clamp arranged closer to a vascular access of the patient than a respective of a first gas inlet and a second gas inlet, wherein the control unit is configured to command each of the return blood safety clamp and the withdrawal blood safety clamp between an open position, wherein flow is allowed, and a closed position wherein flow is prevented, wherein the at least one gas inlet comprises the first gas inlet arranged on the blood return line and the second gas inlet arranged on the blood withdrawal line, wherein the blood pump is arranged on the blood withdrawal line, the second gas inlet interposed between the blood pump and the second end of the blood withdrawal line, the apparatus comprising a first intercepting element connected to the first gas inlet and a second intercepting element connected to the second gas inlet, and wherein the control unit is configured to command each of the first intercepting element and the second intercepting element between an open position, wherein gas flow is allowed, and a closed position wherein gas flow is prevented.

7. The apparatus of claim 6, wherein according to a first configuration, the control unit executes the blood restitution procedure, the control unit configured to:

command infusion of the predetermined amount of sterile fluid into the blood circuit through an infusion line or by back-filtering a dialysis fluid through the semi-permeable membrane, causing the sterile fluid to pass beyond the location of the first gas inlet, and defining the first fluid-blood interface and the second fluid-blood interface;

command the first intercepting element of the first gas inlet on the blood return line in the open position, the second intercepting element of the second gas inlet on the blood withdrawal line in the closed position, the return blood safety clamp in the closed position, and the withdrawal blood safety clamp in the open position;

command activation of the blood pump in a direction towards the second end of the blood withdrawal line to cause sucking of the predetermined amount of gas into the blood circuit from the first gas inlet, defining the first and the second gas-fluid interfaces and causing the second gas-fluid interface and the second fluid-blood interface to move towards the second end of the blood withdrawal line, causing partial blood restitution to the patient through the blood withdrawal line;

command the withdrawal blood safety clamp in the closed position, the return blood safety clamp in the open position, the first intercepting element of the first gas inlet on the blood return line in the closed position and the second intercepting element of the second gas inlet on the blood withdrawal line in the open position;

command activation of the blood pump in a direction towards the second end of the blood return line, causing the first gas-fluid interface and the first fluid-blood interface to move towards the second end of the blood return line, causing restitution to the patient of an amount of blood through the blood return line; and before infusing the predetermined amount of the sterile fluid into the blood circuit, command
(i) the return blood safety clamp in the open position; and
(ii) the withdrawal blood safety clamp in the closed position or the blood pump to stop.

8. The apparatus of claim 6, wherein the restitution procedure according to a second configuration is configured to:

command infusion of the predetermined amount of sterile fluid into the blood circuit through an infusion line or by back-filtering a dialysis fluid through the semi-permeable membrane, such that the sterile fluid passes beyond the location of the at least one gas inlet, the at least one gas inlet being arranged on the blood return line, wherein the first fluid-blood interface and the second fluid-blood interface are defined;

determine a partial blood restitution through the blood return line due to the sterile fluid infusion, the return blood safety clamp being in the open position;

command an intercepting element of the at least one gas inlet in the open position, the return blood safety clamp in the closed position, and the withdrawal blood safety clamp in the open position; and command activation of the blood pump in a direction towards the second end of the blood withdrawal line to cause sucking of the predetermined amount of gas into the blood circuit from the at least one gas inlet, wherein the second gas-fluid interface and the second fluid-blood interface are moved towards the second end of the blood withdrawal line, causing blood restitution to the patient through the blood withdrawal line.

9. The apparatus of claim 6, comprising a gas supply unit connected to the first gas inlet and to the second gas inlet, and configured to forcedly infuse gas into the blood circuit, wherein the restitution procedure, according to a third configuration, is performed via the following steps:

commanding infusion of the predetermined amount of sterile fluid into the blood circuit through an infusion line or by back-filtering a dialysis fluid through the semi-permeable membrane, a step of determining the sterile fluid to pass beyond the location of the first gas inlet, a step defining the first fluid-blood interface and the second fluid-blood interface;

commanding at least one of the first intercepting element of the first gas inlet and the second intercepting element of the second gas inlet in the open position;

commanding at least one of the return blood safety clamp or the withdrawal blood safety clamp in the open position; and commanding activation of the gas supply unit to infuse gas into the blood circuit, thereby determining the at least one gas-fluid interface and the at least one fluid-blood interface to move towards the second end of the blood withdrawal line causing restitution to the patient of an amount of blood through the blood withdrawal line and/or towards the second end of the blood return line causing restitution to the patient of an amount of blood through the blood return line, the command activation of the gas supply unit step causing:
the second gas-fluid interface and the second fluid-blood interface to move towards the second end of the blood withdrawal line, causing restitution to the patient of an amount of blood through the blood withdrawal line,
the first gas-fluid interface and the first fluid-blood interface to move towards the second end of the blood return line, causing restitution to the patient of an amount of blood through the blood return line, and
before the step of infusing the sterile fluid into the blood circuit, command at least one of the return blood safety clamp or the withdrawal blood safety clamp to be in the open position.

10. The apparatus of claim 9, wherein the control unit is configured to command the positions of the return blood safety clamp or the withdrawal blood safety clamp during infusion of gas into the blood circuit by the gas supply unit according to the third configuration of the restitution procedure to determine:
a simultaneous blood restitution through the blood withdrawal line and the blood return line when the return blood safety clamp and the withdrawal blood safety clamp are both commanded in the open position, wherein the first fluid-blood interface and the first gas-fluid interface move towards the second end of the blood return line and the second fluid-blood interface and the second gas-fluid interface move towards the second end of the blood withdrawal line.

11. The apparatus of claim 9, wherein the control unit is configured to command the positions of the return blood safety clamp or the withdrawal blood safety clamp during the infusion of gas into the blood circuit by the gas supply unit according to the third configuration of the restitution procedure to determine:
an arterial blood restitution through the blood withdrawal line when the return blood safety clamp is commanded in the closed position and the withdrawal blood safety clamp is commanded in the open position, wherein the second fluid-blood interface and the second gas-fluid interface move towards the second end of the blood withdrawal line.

12. The apparatus of claim 9, wherein the control unit is configured to command the positions of the return blood safety clamp or the withdrawal blood safety clamp during the infusion of gas into the blood circuit by the gas supply unit according to the third configuration of the restitution procedure to determine:
a venous blood restitution through the blood return line when the return blood safety clamp is commanded in the open position and the withdrawal blood safety clamp is commanded in the closed position, wherein the first fluid-blood interface and the first gas-fluid interface move towards the second end of the blood return line.

13. The apparatus of claim 1, wherein the control unit is configured to stop the restitution procedure when the at least one fluid-blood interface approaches at least one of the second end of the blood withdrawal line or the second end of the blood return line, or when a preset amount of sterile fluid has been infused into the patient.

14. The apparatus of claim 1, wherein the control unit is configured to stop the restitution procedure when the at least one gas-fluid interface reaches a preset distance of less than 10 centimeters from at least one of the second end of the blood withdrawal line or the second end of the blood return line, wherein the distance is measured along the respective blood line.

15. The apparatus of claim 1, wherein the control unit is configured to infuse the sterile fluid into the blood circuit and to cause the gas to enter into the blood circuit such that a distance between the at least one fluid-blood interface and the at least one gas-fluid interface is from 0.5 cm to 10 cm, wherein the distance is measured along the respective blood line.

16. The apparatus of claim 1, wherein the blood circuit defines a blood circuit inner volume determined via an inner volume of the blood withdrawal line, the blood return line, an air separator, and of the primary chamber of the filtration unit, wherein the predetermined amount of sterile fluid is from 1% to 60% of the blood circuit inner volume.

17. The apparatus of claim 1, wherein the blood circuit comprises at least one gas sensor arranged close to the second end of the blood withdrawal line and/or to the second end of the blood return line, the at least one gas sensor configured to provide a signal representative of the presence of gas in the respective blood line,
the control unit configured to receive the signal and to stop advancement of the at least one gas-fluid interface, and
the control unit further configured to implement at least one of the following operations:
stopping the blood pump or a gas supply unit,
moving a blood withdrawal intercepting element into a closed position when the at least one gas sensor arranged close to the second end of the blood withdrawal line detects gas, or
moving a blood return intercepting element into a closed position when the at least one gas sensor arranged close to the second end of the blood return line detects gas.

18. The apparatus of claim 1, wherein, during the blood restitution procedure and during the gas infusion, the blood withdrawal line and the blood return line are both connected to a cardiovascular access of the patient,
wherein infusing the predetermined amount of sterile fluid causes a partial blood restitution to the patient, the blood restituted to the patient being substantially equal in volume to the predetermined amount of sterile fluid.

19. The apparatus of claim 2, further comprising a dialysis fluid pump operable with the dialysis fluid supply line and a dialysate pump operable with the dialysis fluid effluent line, wherein the control unit is configured to activate the dialysis fluid pump to (i) infuse the predetermined amount of sterile fluid into the blood circuit by back filtering the fluid through the membrane of the filtration unit or (ii) provide fluid to the infusion line.

20. The apparatus of claim 1, wherein the blood withdrawal and return lines are made of transparent material so that, at least during the restitution procedure, the positions of the at least one fluid-blood interface and the at least one gas-fluid interface are visible.

21. An apparatus for extracorporeal blood treatment comprising:
a filtration unit having a primary chamber and a secondary chamber separated by a semi-permeable membrane;
a blood circuit including:
a blood withdrawal line extending between a first end connected to an inlet of the primary chamber and a second end for connection to a patient, and
a blood return line extending between a first end connected to an outlet of the primary chamber and a second end for connection to the patient;
a blood pump operable with the blood circuit;
a fluid circuit including:
a dialysis fluid effluent line connected to an outlet of the secondary chamber, and
a fluid supply source for providing a sterile fluid;
at least one gas inlet to allow gas to enter into the blood circuit; and
a control unit configured to perform a blood restitution procedure towards the patient for ending an extracorporeal blood treatment and before disconnecting the patient, the blood restitution procedure comprising:
infusing a predetermined amount of the sterile fluid from the fluid supply source into the blood circuit, the sterile fluid infusion defining at least one fluid-blood interface into the blood circuit, causing a predetermined amount of gas to enter into the blood circuit from the at least one gas inlet to define at least one gas-fluid interface into the blood circuit, wherein at least part of the sterile fluid is interposed between the at least one fluid-blood interface and the at least one gas-fluid interface, and moving simultaneously
(i) at least part of the extracorporeal blood contained in the blood circuit,
(ii) the at least part of the sterile fluid interposed between the at least one fluid-blood interface and the at least one gas-fluid interface, and
(iii) at least part of the gas towards the patient to restitute part of the blood to the patient before patient disconnection, wherein the apparatus further comprises a return blood safety clamp arranged on the blood return line and a withdrawal blood safety clamp arranged on the blood withdrawal line, the safety clamps arranged closer to a vascular access of the patient than a respective of a first gas inlet and a second gas inlet, wherein the control unit is configured to command each of the return blood safety clamp and the withdrawal blood safety clamp between an open position, wherein flow is allowed, and a closed position wherein flow is prevented, wherein the at least one gas inlet comprises the first gas inlet arranged on the blood return line and the second gas inlet arranged on the blood withdrawal line, wherein the blood pump is arranged on the blood withdrawal line, the second gas inlet is interposed between the blood pump and the second end of the blood withdrawal line, the apparatus further comprising a first intercepting element connected to the first gas inlet and a second intercepting element connected to the second gas inlet, and wherein the control unit is configured to command the first intercepting element and the second intercepting element between an open position, wherein gas flow is allowed, and a closed position wherein gas flow is prevented, and wherein according to a first configuration, the control unit executes the blood restitution procedure, the control unit being configured to:

command infusion of the predetermined amount of the sterile fluid into the blood circuit through an infusion line or by back-filtering a dialysis fluid through the semi-permeable membrane, causing the sterile fluid to pass beyond the location of the first gas inlet, and defining a first fluid-blood interface and a second fluid-blood interface;

command the first intercepting element of the first gas inlet on the blood return line in the open position, the second intercepting element of the second gas inlet on the blood withdrawal line in the closed position, the return blood safety clamp in the closed position, and the withdrawal blood safety clamp in the open position;

command activation of the blood pump in a direction towards the second end of the blood withdrawal line to cause sucking of the predetermined amount of gas into the blood circuit from the first gas inlet, defining first and second gas-fluid interfaces and causing the second gas-fluid interface and the second fluid-blood interface to move towards the second end of the blood withdrawal line, causing partial blood restitution to the patient through the blood withdrawal line;

command the withdrawal blood safety clamp in the closed position, the return blood safety clamp in the open position, the first intercepting element of the first gas inlet on the blood return line in the closed position and the second intercepting element of the second gas inlet on the blood withdrawal line in the open position;

command activation of the blood pump in a direction towards the second end of the blood return line, causing the first gas-fluid interface and the first fluid-blood interface to move towards the second end of the blood return line, causing restitution to the patient of an amount of blood through the blood return line; and before infusing the predetermined amount of the sterile fluid into the blood circuit, command
(i) the return blood safety clamp in the open position; and
(ii) the withdrawal blood safety clamp in the closed position or the blood pump to stop.

22. The apparatus of claim 21, wherein the fluid circuit further comprises a dialysis fluid supply line connected to an inlet of the secondary chamber, the fluid supply source being a dialysis fluid supply source and providing a dialysis fluid at least to the dialysis fluid supply line, wherein the sterile fluid infusion from the dialysis fluid supply source into the blood circuit comprises back-filtering the dialysis fluid through the semi-permeable membrane into the blood circuit in an amount of dialysis fluid to at least reach and pass beyond a location of the at least one gas inlet.

23. The apparatus of claim 21, wherein the fluid circuit further comprises the infusion line fluidly connected to the blood circuit, and wherein the infusion line is configured to infuse the sterile fluid into the blood circuit at an infusion point interposed between the first end and the second end of the blood withdrawal line or of the blood return line.

24. An apparatus for extracorporeal blood treatment comprising:
a filtration unit having a primary chamber and a secondary chamber separated by a semi-permeable membrane;
a blood circuit including:
a blood withdrawal line extending between a first end connected to an inlet of the primary chamber and a second end for connection to a patient, and
a blood return line extending between a first end connected to an outlet of the primary chamber and a second end for connection to the patient;
a blood pump operable with the blood circuit;
a fluid circuit including:
a dialysis fluid effluent line connected to an outlet of the secondary chamber, and
a fluid supply source for providing a sterile fluid;
at least one gas inlet to allow gas to enter into the blood circuit; and
a control unit configured to perform a blood restitution procedure towards the patient for ending an extracorporeal blood treatment and before disconnecting the patient, the blood restitution procedure comprising:
infusing a predetermined amount of the sterile fluid from the fluid supply source into the blood circuit, the sterile fluid infusion defining at least one fluid-blood interface into the blood circuit,
causing a predetermined amount of gas to enter into the blood circuit from the at least one gas inlet to define at least one gas-fluid interface into the blood circuit, wherein at least part of the sterile fluid is interposed between the at least one fluid-blood interface and the at least one gas-fluid interface, and moving simultaneously
(i) at least part of the extracorporeal blood contained in the blood circuit,
(ii) the at least part of the sterile fluid interposed between the at least one fluid-blood interface and the at least one gas-fluid interface, and
(iii) at least part of the gas
towards the patient to restitute part of the blood to the patient before patient disconnection,
wherein the apparatus further comprises a return blood safety clamp arranged on the blood return line and a withdrawal blood safety clamp arranged on the blood withdrawal line, the safety clamps arranged closer to a vascular access of the patient than a respective of a first gas inlet and a second gas inlet,
wherein the control unit is configured to command each of the return blood safety clamp and the withdrawal blood safety clamp between an open position, wherein flow is allowed, and a closed position wherein flow is prevented,
wherein the at least one gas inlet comprises the first gas inlet arranged on the blood return line and the second gas inlet arranged on the blood withdrawal line,
wherein the blood pump is arranged on the blood withdrawal line, the second gas inlet is interposed between the blood pump and the second end of the blood withdrawal line, the apparatus further comprising a first intercepting element connected to the first gas inlet and a second intercepting element connected to the second gas inlet,
wherein the control unit is configured to command the first intercepting element and the second intercepting element between an open position, wherein gas flow is allowed, and a closed position wherein gas flow is prevented, and
wherein the restitution procedure according to a second configuration is configured to:
command infusion of the predetermined amount of sterile fluid into the blood circuit through an infusion line or by back-filtering a dialysis fluid through the semi-permeable membrane, such that the sterile fluid passes beyond the location of the at least one gas inlet, the at least one gas inlet being arranged on the blood return line, wherein a first fluid-blood interface and a second fluid-blood interface are defined;
determine a partial blood restitution through the blood return line due to the sterile fluid infusion, the return blood safety clamp being in the open position;
command at least one of the first intercepting element of the first gas inlet and the second intercepting element of the second gas inlet in the open position, the return blood safety clamp in the closed position, and the withdrawal blood safety clamp in the open position; and
command activation of the blood pump in a direction towards the second end of the blood withdrawal line to cause sucking of the predetermined amount of gas into the blood circuit from the at least one gas inlet, wherein a second gas-fluid interface and the second fluid-blood interface are moved towards the second end of the blood withdrawal line, causing blood restitution to the patient through the blood withdrawal line.

25. An apparatus for extracorporeal blood treatment comprising:
a filtration unit having a primary chamber and a secondary chamber separated by a semi-permeable membrane;
a blood circuit including:
a blood withdrawal line extending between a first end connected to an inlet of the primary chamber and a second end for connection to a patient, and
a blood return line extending between a first end connected to an outlet of the primary chamber and a second end for connection to the patient;
a blood pump operable with the blood circuit;
a fluid circuit including:
a dialysis fluid effluent line connected to an outlet of the secondary chamber, and
a fluid supply source for providing a sterile fluid;
at least one gas inlet to allow gas to enter into the blood circuit; and
a control unit configured to perform a blood restitution procedure towards the patient for ending an extracorporeal blood treatment and before disconnecting the patient, the blood restitution procedure comprising:
infusing a predetermined amount of the sterile fluid from the fluid supply source into the blood circuit, the sterile fluid infusion defining at least one fluid-blood interface into the blood circuit,
causing a predetermined amount of gas to enter into the blood circuit from the at least one gas inlet to define at least one gas-fluid interface into the blood circuit, wherein at least part of the sterile fluid is interposed between the at least one fluid-blood interface and the at least one gas-fluid interface, and
moving simultaneously
(i) at least part of the extracorporeal blood contained in the blood circuit,
(ii) the at least part of the sterile fluid interposed between the at least one fluid-blood interface and the at least one gas-fluid interface, and
(iii) at least part of the gas
towards the patient to restitute part of the blood to the patient before patient disconnection,
wherein the at least one fluid-blood interface comprises a first fluid-blood interface and a second fluid-blood interface into the blood circuit, wherein the first fluid-blood interface is interposed between the sterile fluid and the second end of the blood return line and the second fluid-blood interface is interposed between the sterile fluid and the second end of the blood withdrawal line,
wherein the at least one gas-fluid interface comprises a first gas-fluid interface and a second gas-fluid interface into the blood circuit, wherein, at least after the gas has entered the blood circuit, at least part of the sterile fluid is interposed between the first fluid-blood interface and the first gas-fluid interface and at least part of the sterile fluid is interposed between the second fluid-blood interface and the second gas-fluid interface,
wherein the apparatus further comprises a return blood safety clamp arranged on the blood return line and a withdrawal blood safety clamp arranged on the blood withdrawal line, the safety clamps arranged closer to a vascular access of the patient than a respective of a first gas inlet and a second gas inlet,
wherein the control unit is configured to command each of the return blood safety clamp and the withdrawal blood safety clamp between an open position, wherein flow is allowed, and a closed position wherein flow is prevented,
wherein the at least one gas inlet comprises the first gas inlet arranged on the blood return line and the second gas inlet arranged on the blood withdrawal line, wherein the blood pump is arranged on the blood withdrawal line, the second gas inlet is interposed between the blood pump and the second end of the blood withdrawal line, the apparatus further comprising a first intercepting element connected to the first gas inlet and a second intercepting element connected to the second gas inlet, wherein the control unit is configured to command the first intercepting element and the second intercepting element between an open position, wherein gas flow is allowed, and a closed position wherein gas flow is prevented, and wherein the apparatus further comprises a gas supply unit connected to the first gas inlet and to the second gas inlet, and configured to forcedly infuse gas into the blood circuit, wherein the restitution procedure, according to a third configuration, is performed via the following steps:

commanding infusion of the predetermined amount of sterile fluid into the blood circuit through an infusion line or by back-filtering a dialysis fluid through the semi-permeable membrane, a step of determining the sterile fluid to pass beyond the location of the first gas inlet, a step of defining the first fluid-blood interface and the second fluid-blood interface;

commanding at least one of the first intercepting element of the first gas inlet and the second intercepting element of the second gas inlet in the open position;

commanding at least one of the return blood safety clamp or the withdrawal blood safety clamp in the open position; and commanding activation of the gas supply unit to infuse gas into the blood circuit, thereby determining the at least one gas-fluid interface and the at least one fluid-blood interface to move towards the second end of the blood withdrawal line causing restitution to the patient of an amount of blood through the blood withdrawal line and/or towards the second end of the blood return line causing restitution to the patient of an amount of blood through the blood return line, the command activation of the gas supply unit step causing:

the second gas-fluid interface and the second fluid-blood interface to move towards the second end of the blood withdrawal line, causing restitution to the patient of an amount of blood through the blood withdrawal line, the first gas-fluid interface and the first fluid-blood interface to move towards the second end of the blood return line, causing restitution to the patient of an amount of blood through the blood return line, and before the step of infusing the sterile fluid into the blood circuit, command at least one of the return blood safety clamp or the withdrawal blood safety clamp to be in the open position.

* * * * *